US008630852B2

(12) United States Patent
Itoh

(10) Patent No.: US 8,630,852 B2
(45) Date of Patent: Jan. 14, 2014

(54) IMAGE PROCESSING APPARATUS, SPEECH RECOGNITION PROCESSING APPARATUS, CONTROL METHOD FOR SPEECH RECOGNITION PROCESSING APPARATUS, AND COMPUTER-READABLE STORAGE MEDIUM FOR COMPUTER PROGRAM

(75) Inventor: Ayumi Itoh, Ikoma-gun (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 681 days.

(21) Appl. No.: 12/883,388

(22) Filed: Sep. 16, 2010

(65) Prior Publication Data

US 2011/0071829 A1 Mar. 24, 2011

(30) Foreign Application Priority Data

Sep. 18, 2009 (JP) .................. 2009-218132

(51) Int. Cl.
*G10L 15/06* (2013.01)
*G10L 21/00* (2013.01)
(52) U.S. Cl.
USPC .......................................... 704/243; 704/270
(58) Field of Classification Search
USPC ................................................. 704/231–257
See application file for complete search history.

(56) References Cited

U.S. PATENT DOCUMENTS

| | | | |
|---|---|---|---|
| 5,632,002 A * | 5/1997 | Hashimoto et al. ........... | 704/231 |
| 6,349,282 B1 * | 2/2002 | Van Aelten et al. .......... | 704/257 |
| 7,120,582 B1 * | 10/2006 | Young et al. .................. | 704/255 |
| 7,921,011 B2 * | 4/2011 | Hernandez Abrego et al. ............................ | 704/254 |
| 7,957,968 B2 * | 6/2011 | Gupta et al. .................. | 704/243 |
| 2006/0106604 A1 * | 5/2006 | Okimoto ....................... | 704/243 |
| 2008/0262843 A1 * | 10/2008 | Katsuragawa et al. ....... | 704/253 |
| 2010/0057457 A1 * | 3/2010 | Ogata et al. ................... | 704/235 |

FOREIGN PATENT DOCUMENTS

| | | |
|---|---|---|
| JP | 2001-027540 A | 1/2001 |
| JP | 2002-108389 A | 4/2002 |
| JP | 2004-294872 | 10/2004 |
| JP | 2004-309654 | 11/2004 |
| JP | 2005-338274 | 12/2005 |
| JP | 2008-268571 | 11/2008 |

OTHER PUBLICATIONS

Office Action (Notification of Reason(s) for Refusal) dated Aug. 2, 2011, issued in the corresponding Japanese Application No. 2009-218132, and an English Translation thereof.
Office Action dated Apr. 24, 2012, issued in corresponding Japanese Patent Application No. 2009-218132. (2 pages).

\* cited by examiner

*Primary Examiner* — Samuel G Neway
(74) *Attorney, Agent, or Firm* — Buchanan Ingersoll & Rooney PC

(57) ABSTRACT

An image processing apparatus includes a speech input portion that receives an input of speech from a user, a dictionary storage portion that stores a dictionary configured by phrase information pieces for recognizing the speech, a compound phrase generation portion that generates a plurality of compound phrases formed by all combinations of a plurality of predetermined phrases in different orders, a compound phrase registration portion that registers the plurality of compound phrases that have been generated in the dictionary as the phrase information pieces, a speech recognition portion that, in a case where speech including a speech phrase formed by the plurality of predetermined phrases said in an arbitrary order has been input, performs speech recognition on the speech by searching the dictionary for a compound phrase that matches the speech phrase.

10 Claims, 33 Drawing Sheets

| | BT | WU1 | WU2 | WU3 | WU4 | |
|---|---|---|---|---|---|---|
| | REGISTRATION NUMBER | REGISTERED NAME | READING (registered name) | SEARCH CHARACTER | ADDRESS TYPE | ADDRESS |
| | 001 | TAKEDA | takeda | ta | E-mail | takeda@xxx.xx.jp ⟩ DT1 |
| | 002 | SUZUKI | suzuki | sa | FAX | 06-XXXX-XXXX ⟩ DT1 |
| | 003 | SATO | sato | sa | SMB | server2 ⟩ DT1 |
| | 004 | KATO | kato | ka | FTP | server1 ⟩ DT1 |
| | 005 | YAMAMOTO | yamamoto | ya | E-mail | yamamoto@xxx.xx.jp ⟩ DT1 |
| | 006 | UESUGI | uesugi | a | E-mail | uesugi@xxx.xx.jp ⟩ DT1 |
| | ... | ... | ... | ... | ... | ... |

| FUNCTION NAME | READING (function name) | |
|---|---|---|
| E-mail | e-mail | ~DT2 |
| SMB | smb | ~DT2 |
| FTP | ftp | ~DT2 |
| FAX | fax | ~DT2 |

| | SCREEN NUMBER | 999 | |
|---|---|---|---|
| GRN | | | |
| BT | PHRASE NUMBER | RECOGNITION PHRASE | WN |
| DT3 | 001 | takeda_e-mail | WF |
| | | e-mail_takeda | WF |
| DT3 | 002 | suzuki_fax | WF |
| | | fax_suzuki | WF |
| DT3 | 003 | sato_smb | WF |
| | | smb_sato | WF |
| | ⋮ | ⋮ | |
| DT3 | 006 | uesugi_e-mail | WF |
| | | e-mail_uesugi | WF |
| | ⋮ | ⋮ | |
| DT3 | 1000 | e-mail | WC(WS) |
| DT3 | 1001 | smb | WC(WS) |
| DT3 | 1002 | ftp | WC(WS) |
| DT3 | 1003 | fax | WC(WS) |
| DT3 | 1004 | top_gamen_e | WC |
| DT3 | 1005 | okei | WC |
| DT3 | 1006 | ue | WC |
| DT3 | 1007 | shita | WC |

| | BT | WU11 | WU12 | WU13 | | |
|---|---|---|---|---|---|---|
| | REGISTRATION NUMBER | BOX NAME | READING (box name) | SEARCH CHARACTER | BOX TYPE | |
| | 300 | TOKUDA | tokuda | ta | KYOYU | ～DT4 |
| | 301 | HARADA | harada | ha | KOJIN | ～DT4 |
| | 302 | YOSHIHARA | yoshihara | ya | SHISUTEMU | ～DT4 |
| | ⋮ | ⋮ | ⋮ | ⋮ | ⋮ | |
| | 325 | UESUGI | uesugi | a | KYOYU | ～DT4 |
| | ⋮ | ⋮ | ⋮ | ⋮ | ⋮ | |

| BOX TYPE | READING (box type) | |
|---|---|---|
| KYOYU | kyoyu | ～ DT5 |
| KOJIN | kojin | ～ DT5 |
| SHISUTEMU | shisutemu | ～ DT5 |
| GURUUPU | guruupu | ～ DT5 |

ITEMS CAN BE SELECTED AND SET.
ENTER A BOX NUMBER USING THE NUMBER KEYS.
SET A SEARCH CHARACTER. IF A SEARCH CHARACTER IS
NOT SET, THE BOX WILL BE REGISTERED IN "etc".

SETTINGS MENU > SHARED/PERSONAL BOX > NEW

| BOX NUMBER | 325 |
| BOX NAME | UESUGI |
| PASSWORD | 47%3\?5 |
| SEARCH CHARACTER | a |
| BOX TYPE | SHARED   PERSONAL   GROUP |
| CREATED DATE | 2009/2/15 10:30 |
| OWNER'S USERNAME | TAKADA |

CHANGE OWNER

CANCEL    OK

| | SCREEN NUMBER | 299 | |
|---|---|---|---|
| GRN | PHRASE NUMBER | RECOGNITION PHRASE | WN |
| BT | | | |
| DT6 | 300 | tokuda_kyoyu | WF |
| | | kyoyu_tokuda | WF |
| DT6 | 301 | harada_kojin | WF |
| | | kojin_harada | WF |
| DT6 | 302 | yoshihara_shisutemu | WF |
| | | shisutemu_yoshihara | WF |
| | ⋮ | ⋮ | WF |
| DT6 | 325 | uesugi_kyoyu | WF |
| | | kyoyu_uesugi | WF |
| | ⋮ | ⋮ | |
| DT6 | 2000 | kyoyu | WC(WS) |
| DT6 | 2001 | kojin | WC(WS) |
| DT6 | 2002 | shisutemu | WC(WS) |
| DT6 | 2003 | guruupu | WC(WS) |
| DT6 | 2004 | bokkusu_kensaku | WC |
| DT6 | 2005 | bokkusu_bango_shitei | WC |
| DT6 | 2006 | kakutei | WC |
| DT6 | 2007 | chushi | WC |
| DT6 | 2008 | okei | WC |
| DT6 | 2009 | ue | WC |
| DT6 | 2010 | shita | WC |

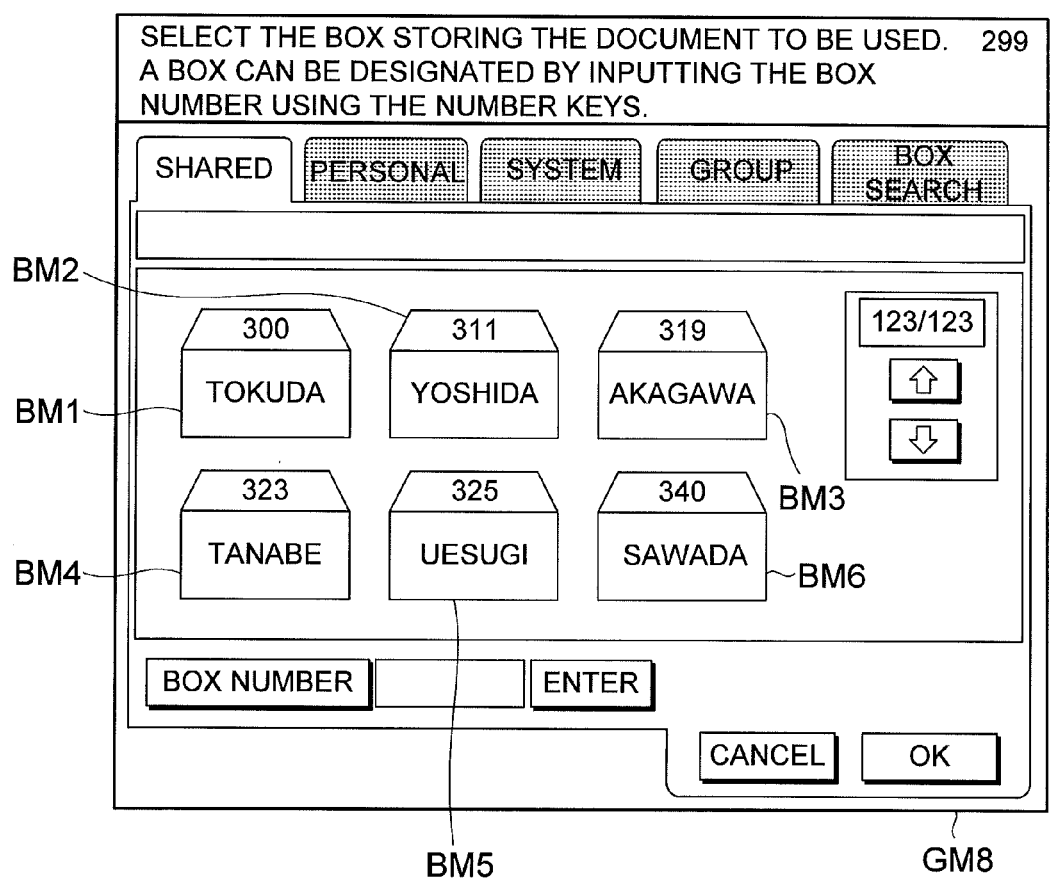

| BT | WU21 | WU22 | WU23 | WS(WU11) | WS(WU12) | |
|---|---|---|---|---|---|---|
| REGISTRATION NUMBER | DOCUMENT NAME | READING (document name) | SEARCH CHARACTER | BOX NAME | READING (box name) | |
| 500 | YOTEIHYO | yoteihyo | ya | TOKUDA | tokuda | ⟩DT7 |
| 501 | MEISAISHO | meisaisho | ma | HARADA | harada | ⟩DT7 |
| 502 | KIKAKUSHO 1 | kikakushoichi | ka | YOSHIHARA | yoshihara | ⟩DT7 |
| ... | ... | ... | ... | ... | ... | |
| 542 | KEIYAKUSHO 1 | keiyakushoichi | ka | UESUGI | uesugi | ⟩DT7 |
| ... | ... | ... | ... | ... | ... | |

```
THE INPUT READING IS ALREADY REGISTERED.
PLEASE INPUT A DIFFERENT READING.

REGISTERED READING    kopi
```

| | SCREEN NUMBER | 299 |
|---|---|---|
| GRN | PHRASE NUMBER | RECOGNITION PHRASE |
| BT | | ←WN |
| DT8 — 500 | | tokuda_yoteihyo ←WF |
| | | yoteihyo_tokuda ←WF |
| DT8 — 501 | | harada_meisaisho ←WF |
| | | meisaisho_harada ←WF |
| DT8 — 502 | | yoshihara_kikakushoichi ←WF |
| | | kikakushoichi_yoshihara ←WF |
| | ⋮ | ⋮ |
| DT8 — 542 | | uesugi_keiyakushoichi ←WF |
| | | keiyakushoichi_uesugi ←WF |
| | ⋮ | ⋮ |
| DT8 — 3000 | | kyoyu ←WC(WS) |
| DT8 — 3001 | | kojin ←WC(WS) |
| DT8 — 3002 | | shisutemu ←WC(WS) |
| DT8 — 3003 | | guruupu ←WC(WS) |
| DT8 — 3004 | | bokkusu_kensaku ←WC |
| DT8 — 3005 | | bokkusu_bango_shitei ←WC |
| DT8 — 3006 | | kakutei ←WC |
| DT8 — 3007 | | chushi ←WC |
| DT8 — 3008 | | okei ←WC |
| DT8 — 3009 | | ue ←WC |
| DT8 — 3010 | | shita ←WC |

| WS | | WU | |
|---|---|---|---|
| (SYSTEM PHRASE) | NO | (USER PHRASE) | SAN O SAGASU |
| (SYSTEM PHRASE) | NO | (USER PHRASE) | SAN O KENSAKU SURU |
| (USER PHRASE) | SAN NO | (SYSTEM PHRASE) | O SAGASU |
| (USER PHRASE) | SAN NO | (SYSTEM PHRASE) | O KENSAKU SURU |

WU / WS

TB9b

| WU | | | WS |
|---|---|---|---|
| LOOK FOR | (USER PHRASE) | 's | (SYSTEM PHRASE) |
| RETRIEVE | (USER PHRASE) | 's | (SYSTEM PHRASE) |
| LOOK FOR | (SYSTEM PHRASE) | FOR | (USER PHRASE) |
| RETRIEVE | (SYSTEM PHRASE) | FOR | (USER PHRASE) |

| e-mail |
| fax |
| smb |
| ftp |
| e-mail_takeda |
| fax_suzuki |
| smb_sato |
| ftp_kato |
| e-mail_yamamoto |
| e-mail_uesugi |
| top_gamen_e |
| okei |
| ue |
| shita |

# IMAGE PROCESSING APPARATUS, SPEECH RECOGNITION PROCESSING APPARATUS, CONTROL METHOD FOR SPEECH RECOGNITION PROCESSING APPARATUS, AND COMPUTER-READABLE STORAGE MEDIUM FOR COMPUTER PROGRAM

This application is based on Japanese patent application No. 2009-218132 filed on Sep. 18, 2009, the contents of which are hereby incorporated by reference.

BACKGROUND OF THE INVENTION

1. Field of the Invention

The present invention relates to an image processing apparatus in which an image reading apparatus that reads an image of an original is included, a speech recognition processing apparatus, a control method for the speech recognition processing apparatus, and a non-transitory computer-readable storage medium.

2. Description of the Related Art

In recent years, image processing apparatuses have been provided with a function for recognizing speech (speech recognition function).

For example, in the case of transmitting image data generated by using a scanner function or the like included in an image processing apparatus to another image processing apparatus, personal computer, or the like, a user can search for a destination (address) for the image data by voice.

Speech recognition requires a recognition dictionary table in which phrases for recognizing speech are registered. Normally, phrases are registered in the recognition dictionary table in units of words, and therefore speech can only be recognized in units of words. Recognizing speech including multiple words therefore requires registering such speech in a grammar, which is a dictionary table for recognizing multiple words as a single phrase.

For example, assume that in order to search by voice for the fax number of a person named "SUZUKI" who is already registered by a user, the user has consecutively said the two words "fax" and "suzuki", as in "fax_suzuki". In this case, if the phrase "fax_suzuki" has been registered, as with a conventional recognition dictionary table TB10 shown in FIG. 33, the user's speech is recognized.

However, it is not always true that the user will always say the same combination of phrases in the same specific order. In the above example, the user may switch the order of the words and say "suzuki_fax".

The image processing apparatus can only recognize speech formed by the phrases registered in the recognition dictionary table. For this reason, if the user has said "suzuki_fax", which has a different order from the phrase "fax_suzuki" that is registered in the recognition dictionary table, the user's speech will not be recognized.

Accordingly, there are cases where it is impossible to recognize speech that is formed by multiple phrases said in different orders while having the same meaning, which may cause confusion for the user. There is also a reduction in the user-friendliness of the image processing apparatus.

Conventionally, a method has been proposed in JP 2002-108389A (hereinafter, referred to as "Patent Document 1") in which a surname dictionary and a first-name dictionary for speech recognition are created, and in the case of searching for an individual's name by voice, speech recognition is executed separately for the surname and first name that have been input in order by voice.

However, even with the method disclosed in Patent Document 1, unless the surname and first name are input by voice in the correct order, it is impossible to correctly perform speech recognition for the input surname and first name. In other words, the method disclosed in Patent Document 1 does not enable recognizing speech formed by multiple words said in different orders while having the same meaning, and the user may feel inconvenienced.

SUMMARY

In light of such issues, an object of the present invention is to correctly perform speech recognition without the user needing to pay attention to the order in which multiple words or phrases are said.

According to an aspect of the present invention, an image processing apparatus including an image reading apparatus that reads an image of an original is provided. The image processing apparatus includes a speech input portion that receives an input of speech from a user, a dictionary storage portion that stores a dictionary configured by phrase information pieces for recognizing the speech, a compound phrase generation portion that generates a plurality of compound phrases formed by all combinations of a plurality of predetermined phrases in different orders, a compound phrase registration portion that registers the plurality of compound phrases that have been generated in the dictionary as the phrase information pieces, a speech recognition portion that, in a case where speech including a speech phrase formed by the plurality of predetermined phrases said in an arbitrary order has been input, performs speech recognition on the speech by searching the dictionary for a compound phrase that matches the speech phrase, and an image processing portion that executes processing on the image based on a result of the speech recognition performed by the speech recognition portion.

These and other characteristics and objects of the present invention will become more apparent by the following descriptions of preferred embodiments with reference to drawings.

BRIEF DESCRIPTION OF THE DRAWINGS

FIG. 5 is a diagram showing an example of a registration information table according to Embodiment 1.

FIG. 6 is a diagram showing an example of a function phrase information table.

FIG. 10 is a diagram showing an example of a recognition dictionary table.

FIG. 16 is a diagram showing an example of a registration information table according to Embodiment 2.

FIG. 17 is a diagram showing an example of a function phrase information table.

FIG. 18 is a diagram showing an example of a box registration screen.

FIG. 20 is a diagram showing an example of a recognition dictionary table.

FIG. 21 is a diagram showing an example of a box selection screen.

FIG. 23 is a diagram showing an example of a registration information table according to Embodiment 3.

FIG. 26 is a diagram showing an example of a warning display screen.

FIG. 27 is a diagram showing an example of a recognition dictionary table.

FIG. 29 is a diagram showing an example of a compound phrase generation table.

FIG. 33 is a diagram showing an example of a conventional recognition dictionary table.

DESCRIPTION OF THE PREFERRED EMBODIMENTS

Figure 1:
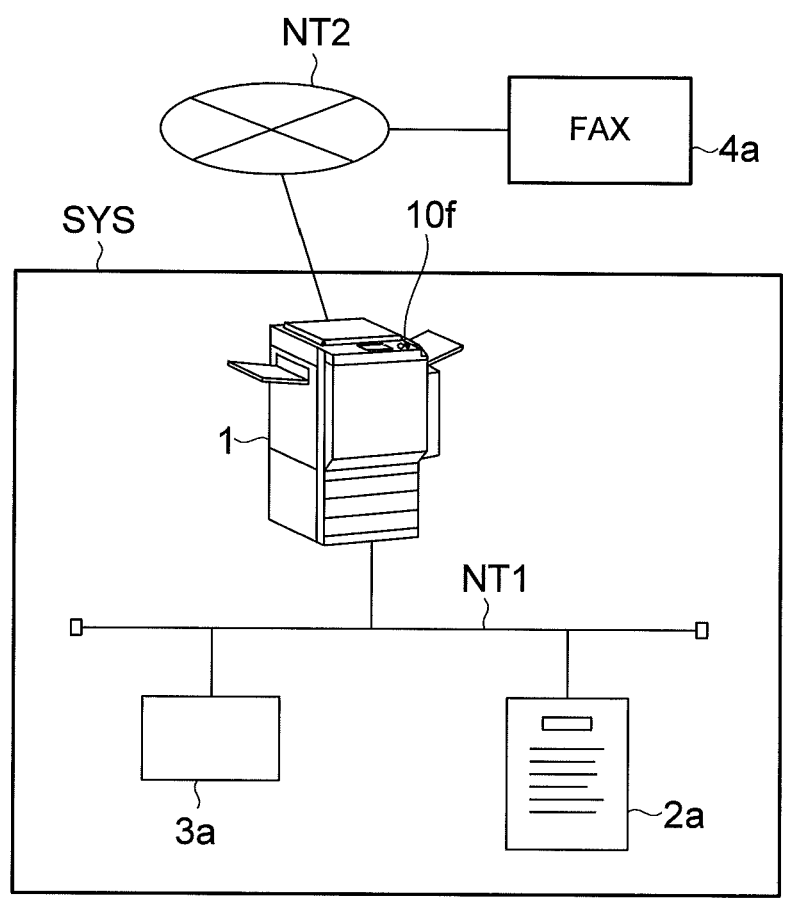
FIG. 1 is a diagram showing an example of a network system including an image processing apparatus according to an embodiment of the present invention.

A network system SYS shown in FIG. 1 is a network system that includes an image forming apparatus 1. The image forming apparatus 1 is an embodiment of an image processing apparatus according to the present invention.

As shown in FIG. 1, the network system SYS is configured by the image forming apparatus 1, a file server 2a, a terminal apparatus 3a, a communication line NT1, and the like.

The image forming apparatus 1, the file server 2a, and the terminal apparatus 3a are connected to each other via the communication line NT1. A LAN, a WAN, an intranet, a leased line or the like can be used as the communication line NT1.

The file server 2a is a file server for managing electronic documents (electronic data).

The terminal apparatus 3 is a terminal apparatus used by users of the network system SYS. The users can use a "PC print function" of the image forming apparatus 1 (described later) with use of the terminal apparatus 3.

A fax terminal 4a performs the transmission and reception of data by facsimile with the image forming apparatus 1 or another fax terminal via a communication line NT2. Note that a public line or the like can be used as the communication line NT2.

The image forming apparatus 1 is an image forming apparatus that includes a collection of various application functions, such as a copy function, a PC print function, a fax transmission function, and E-mail transmission function, an SMB transmission function, an FTP transmission function, and a box function. The image forming apparatus 1 is sometimes called an MFP (Multi Function Peripheral).

In addition to basic functions such as the above-described copy function, the image forming apparatus 1 of the present embodiment includes an execution-by-speech function. The execution-by-speech function is a function for executing speech recognition processing, and executing predetermined processing based on the result of the speech recognition processing. Speech recognition processing is processing for recognizing speech input from a microphone that an operation panel 10f of the image forming apparatus 1 shown in FIG. 1 is provided with, based on a recognition dictionary table (grammar) stored in a storage medium. The case where a user operates the image forming apparatus 1 by saying two words (phrases) consecutively is described as an example in the present embodiment.

Figure 2:
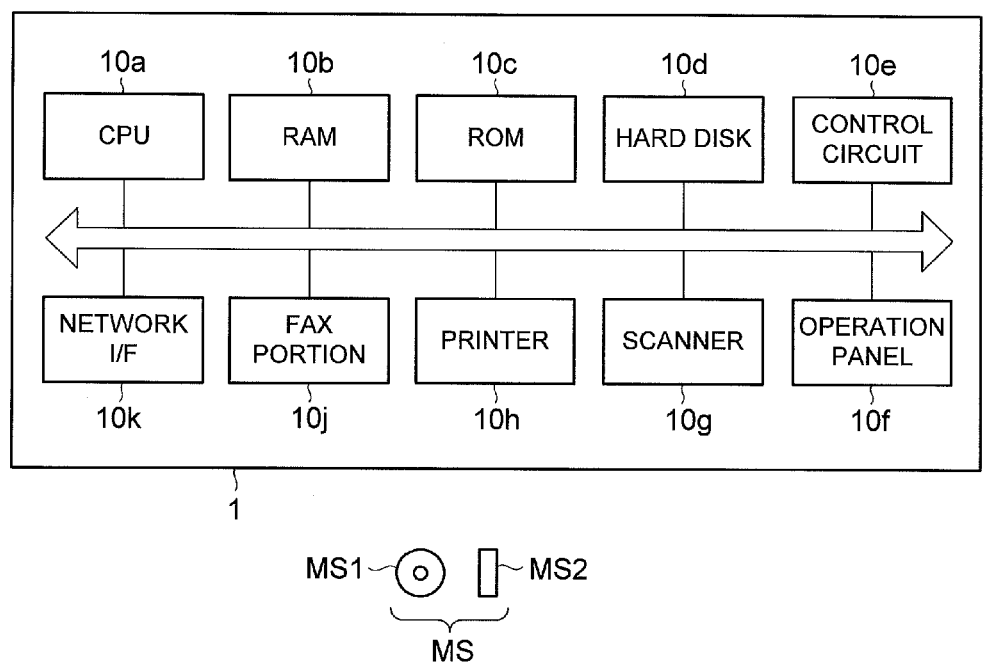
FIG. 2 is a diagram showing an example of a hardware configuration of an image forming apparatus according to an embodiment.

As shown in FIG. 2, the image forming apparatus 1 is configured by a CPU 10a, a RAM 10b, a ROM 10c, a hard disk 10d, a control circuit 10e, the operation panel 10f, a scanner 10g, a printer 10h, a fax portion 10j, a network interface 10k, and the like. The image processing apparatus is formed by all or a portion of these.

The scanner 10g is an apparatus that optically reads an image of a photograph, characters, a picture, a diagram or the like on a paper original (hereinafter, referred to as simply an "original"), and converts the read image to electronic data. In addition to paper, various types of sheet, objects, and the like can be used as the original.

The printer 10h is an apparatus that prints image data read by the scanner 10g or image data transmitted from another apparatus on paper with use of four colors of toner, namely yellow, magenta, cyan, and black.

The fax portion 10j is an apparatus for transmitting image data read by the scanner 10g to a fax terminal via a communication line and receiving image data transmitted from a fax terminal.

The network interface 10k, which is a NIC (Network Interface Card), connects to another apparatus via a LAN, the Internet, or the like, and transmits and receives electronic data, for example.

The control circuit 10e is a circuit for controlling apparatuses such as the hard disk 10d, the operation panel 10f, the scanner 10g, the printer 10h, the fax portion 10j, and the network interface 10k.

The operation panel 10f is an apparatus by which the user gives instructions to the image forming apparatus 1, and for notifying messages from the image forming apparatus 1 to the user.

The previously mentioned application functions are realized by a portion of these apparatuses working in coordination.

The copy function is a function for reading an image of an original with use of the scanner 10g, and printing the thus-obtained image data on paper with use of the printer 10h.

The PC print function is a function for receiving image data or the like from, for example, a terminal apparatus connected to the image forming apparatus 1 (hereinafter, referred to as simply a "terminal apparatus") via a communication line with use of the network interface 10k, and printing the image data or the like on paper with use of the printer 10h. This function is sometimes called "network printing".

The fax transmission function is a function for transmitting image data read by the scanner 10g or the like from the fax portion 10j to a fax terminal or the like.

A fax reception function is a function for receiving image data from a fax terminal or the like with use of the fax portion 10j, and printing the image data on paper with use of the printer 10h.

The E-mail transmission function is a function for attaching image data read by the scanner 10g or the like to an E-mail, and transmitting the E-mail via the network interface 10k.

The SMB transmission function is a function for directly transmitting image data read by the scanner 10g or the like to a destination designated by an IP address or the like, based on SMB (Server Message Block).

The FTP transmission function is a function for transmitting image data read by the scanner 10g or the like based on FTP (File Transfer Protocol).

The box function is a function for providing the hard disk 10d in advance with a storage area (called a "box", "personal box", or the like) corresponding to a folder, directory, or the like in a personal computer for each user, and enabling users to save image data or the like obtained by, for example, operating the scanner 10g in their own storage area. This function is sometimes called "document server function".

In the case of using the PC print function, designating a box in a terminal apparatus in advance enables causing image data for printing to be saved in that box when being printed. A box can be designated by, for example, using a driver function of the image forming apparatus 1 that is installed in the terminal apparatus.

Figure 3:
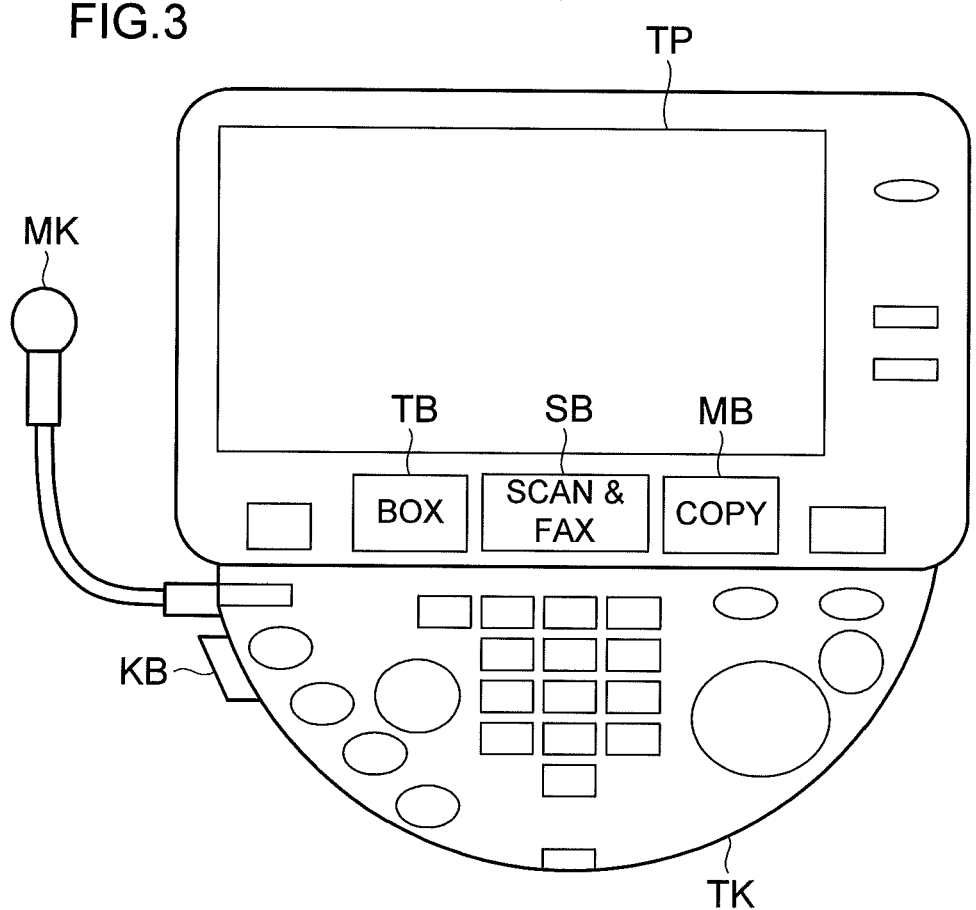
FIG. 3 is a diagram showing an example of an operation panel.

As shown in FIG. 3, the operation panel 10f is provided with a touch panel TP, a microphone MK, an operation portion TK, a speech recognition button KB, a copy button MB, a scan & fax button SB, a box button TB, and the like.

The touch panel TP is a display apparatus that displays messages notified from the image forming apparatus 1 to the user, screens (operation screens) for use of various function, and the like. The functions of the touch panel enable the operation panel 10f to also serve as an input apparatus.

The microphone MK is an apparatus via which the user inputs speech (voice commands), and converts input speech into analog speech data ANDT.

The operation portion TK is a group of buttons for inputting a number of print copies, a fax number, and the like.

The speech recognition button KB is a button for switching to a speech recognition mode (a mode for performing speech recognition). If this button is pressed, the image forming apparatus 1 executes speech recognition processing, and executes predetermined processing based on the result of the speech recognition.

The copy button MB is a button for switching to a print mode (a mode for printing image data or the like on paper). If this button is pressed, a screen for performing setting related to copying (a copy setting screen) is displayed on the touch panel TP.

The scan & fax button SB is a button for switching to a transmission mode (a mode for transmitting image data or the like to another apparatus). If this button is pressed, a screen for setting a destination for image data or the like is displayed on the touch panel TP.

The box button TB is a button for switching to a box mode (a mode for saving image data to a box or referencing image data or the like that is saved in a box). If this button is pressed, a screen for designating a box where image data or the like is to be saved or a box to be referenced is displayed on the touch panel TP.

Figure 4:
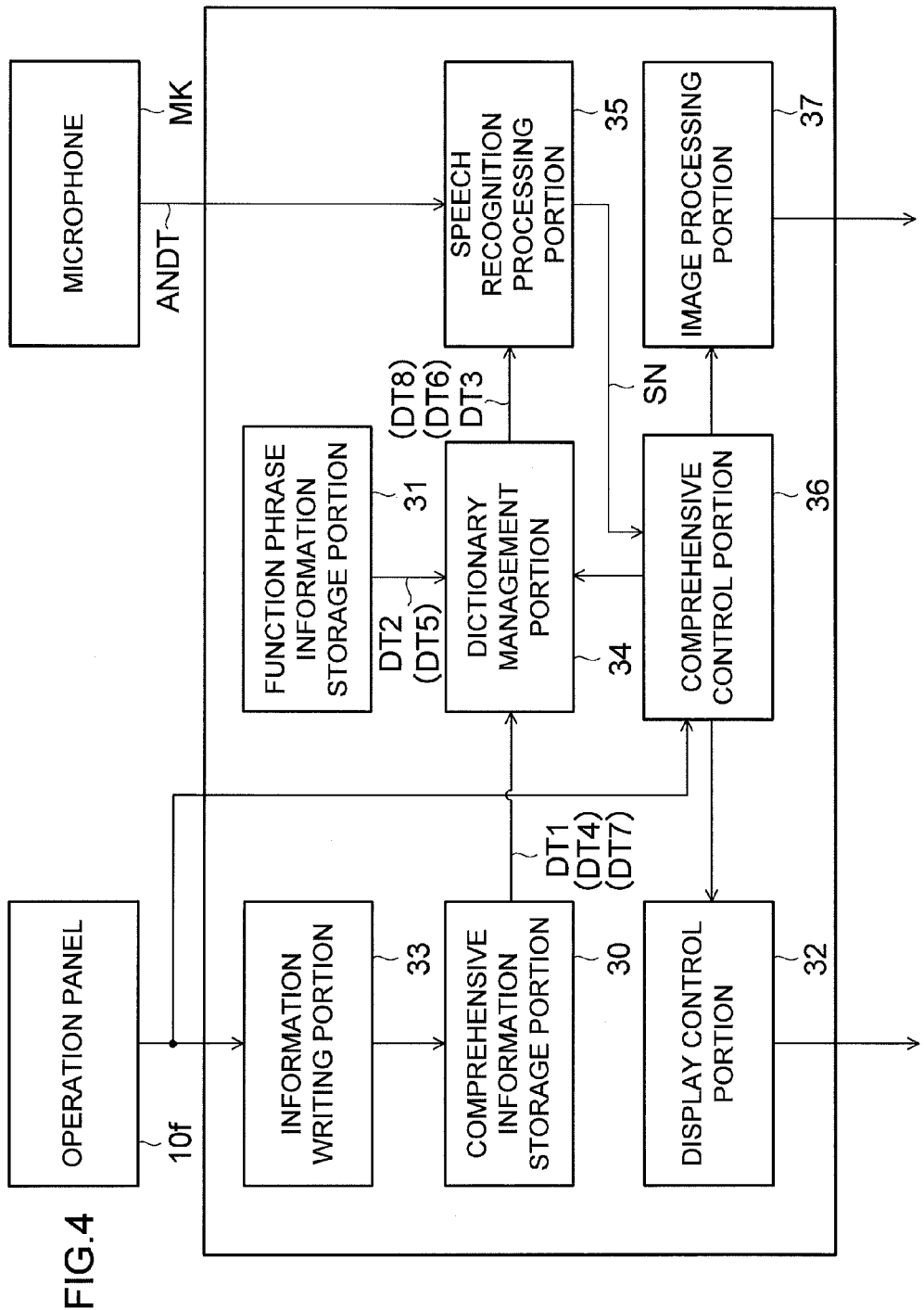
FIG. 4 is a diagram showing an example of a functional configuration of the image forming apparatus.

In FIG. 4, the image forming apparatus 1 has a comprehensive information storage portion 30, a function phrase information storage portion 31, a display control portion 32, an information writing portion 33, a dictionary management portion 34, and a speech recognition processing portion 35. A program for realizing the functionality of these portions can be installed from a portable recording medium MS (see FIG. 2) that includes a recording medium MS1 (e.g., a CD-ROM or a DVD-ROM) or a recording medium MS2 (e.g., a semiconductor memory) on which the program is recorded. Also, the program can be downloaded from a server via a network.

Data and the program for realizing the portions are installed in the hard disk 10d, the program and data are loaded into the RAM 10b as necessary, and the program is executed by the CPU 10a. Note that the CPU 10a can operate as a computer. Also, a configuration is possible in which the CPU 10a connects to an external computer via a LAN or the like. Also, a configuration is possible in which a portion or all of the functionality of the portions in FIG. 4 are realized by a processor (control circuit).

Embodiment 1

Next is a description of Embodiment 1 of the image forming apparatus 1 with reference to FIGS. 4 to 15.

The following description takes the example of the case where a user uses the E-mail transmission function to transmit image data read by the scanner 10g to a person named "UESUGI" by E-mail. It is also assumed that when searching for an E-mail address, the user consecutively says an addressee name and address type that are the search targets.

Figure 7:
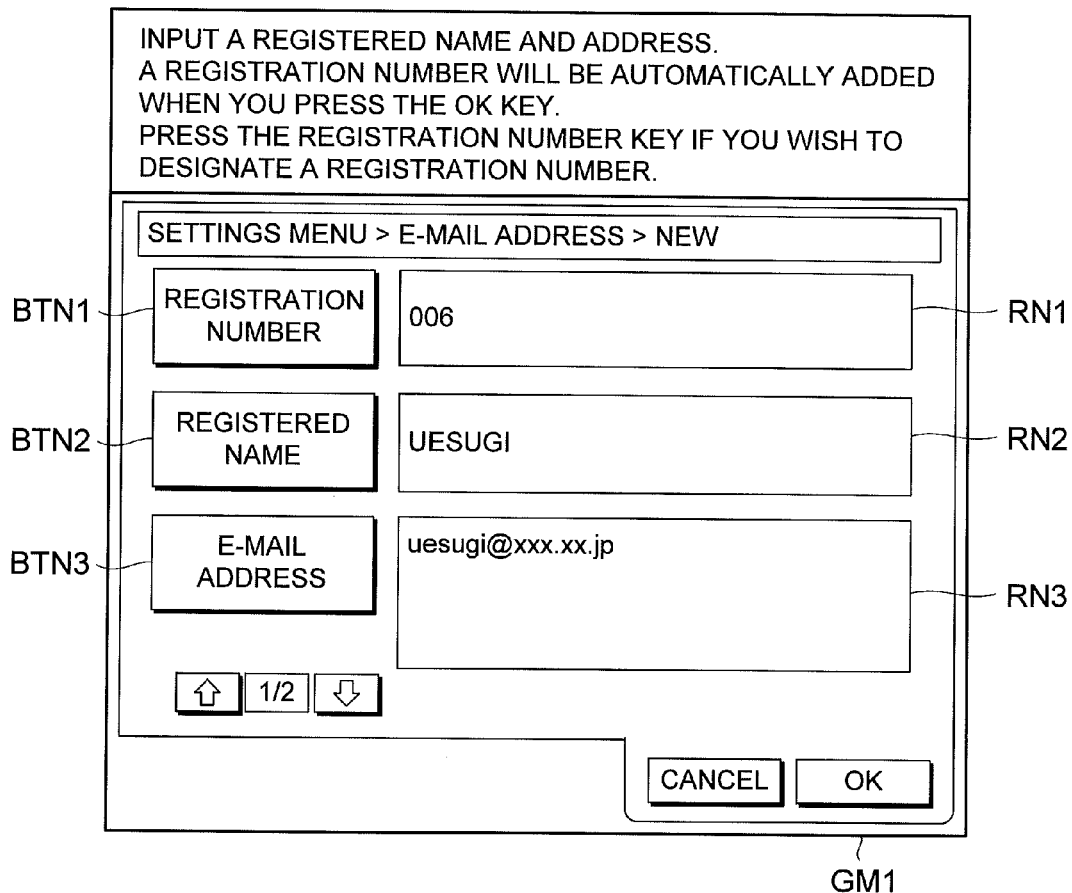
FIG. 7 is a diagram showing an example of an address registration screen.
Figure 8:
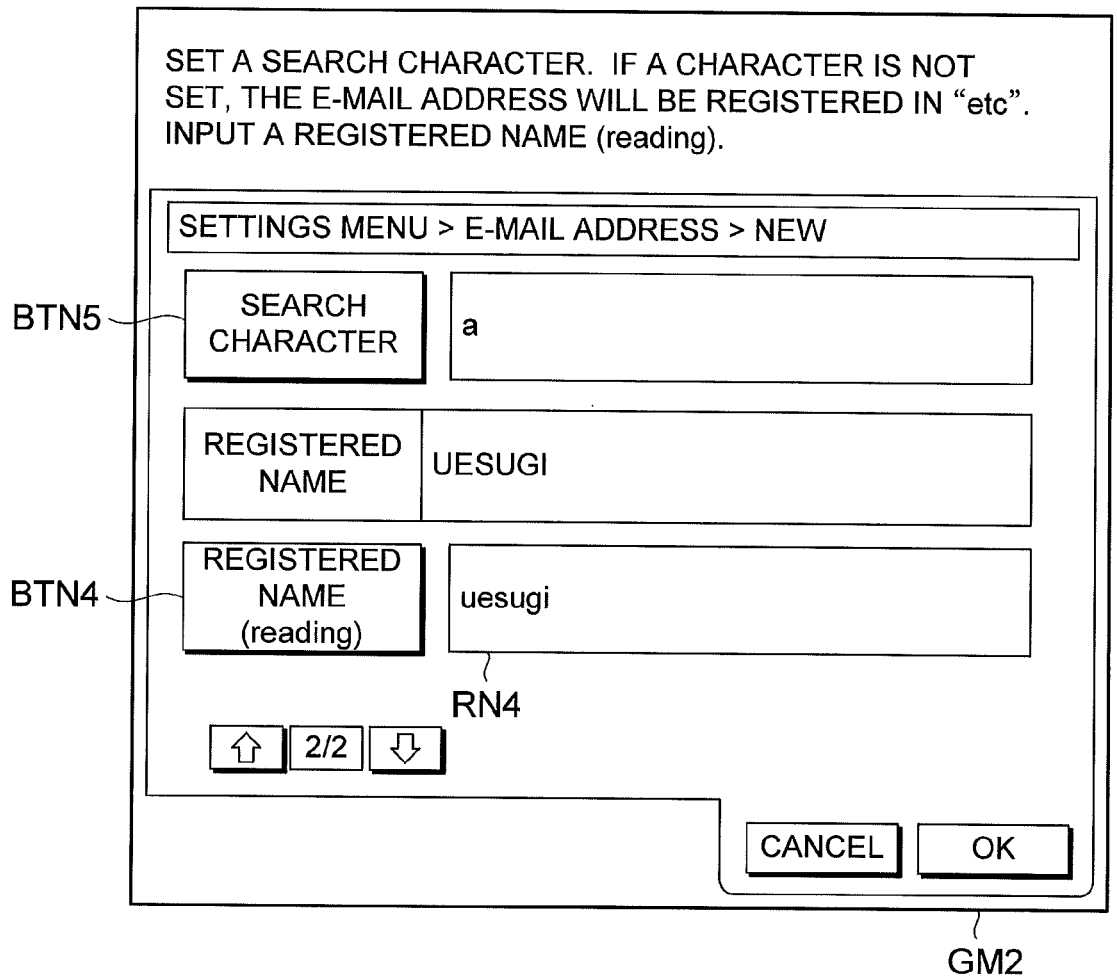
FIG. 8 is a diagram showing an example of a reading registration screen.
Figure 9:
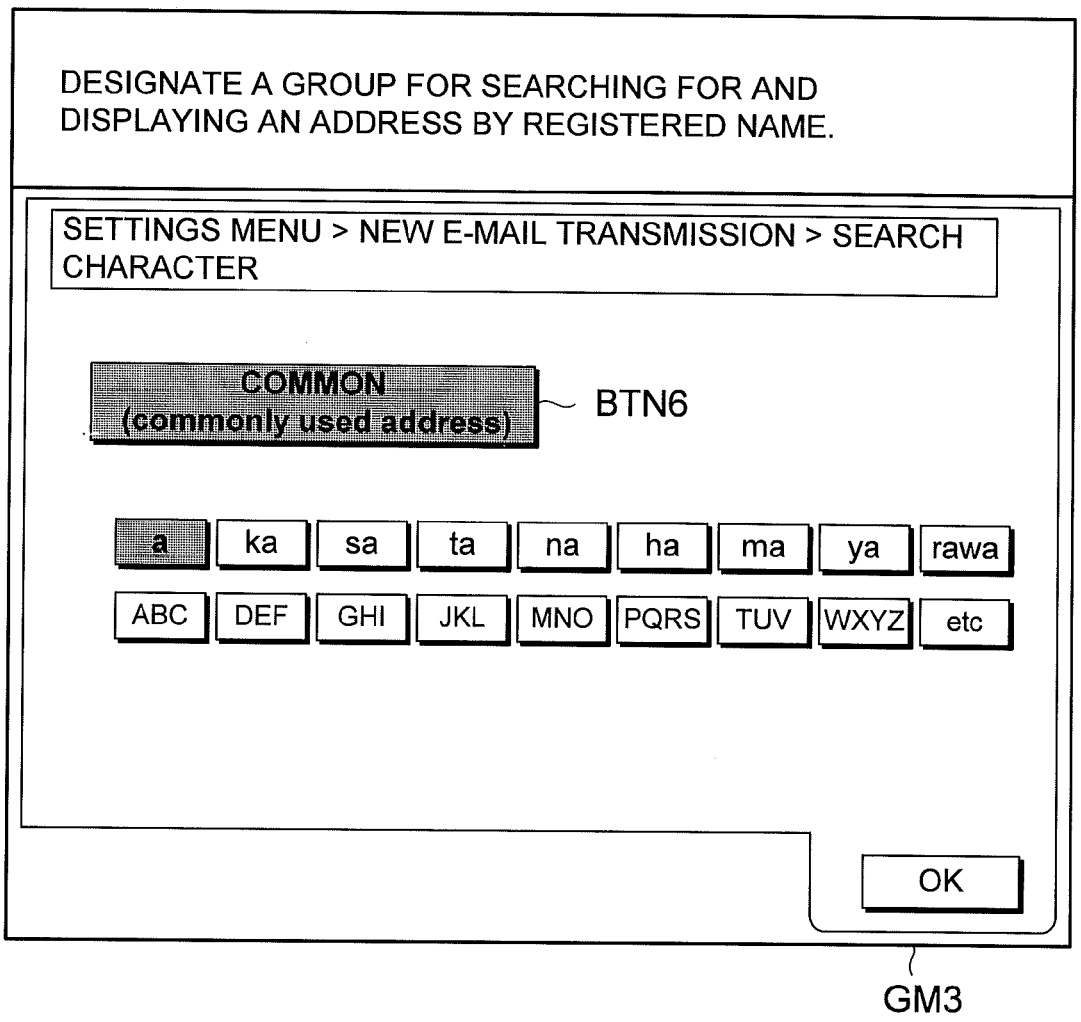
FIG. 9 is a diagram showing an example of a search character input screen.
Figure 11:
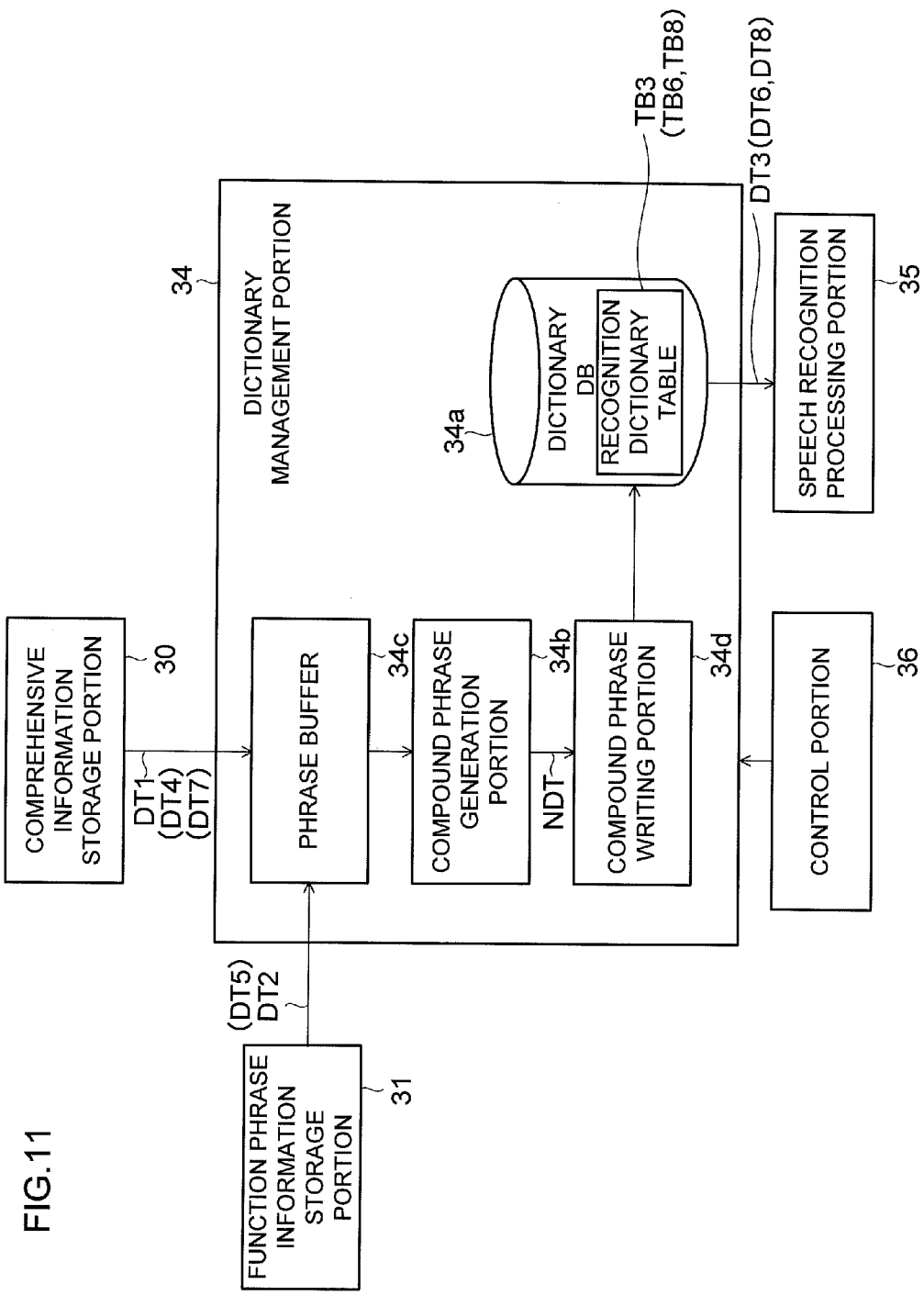
FIG. 11 is a diagram showing an example of a configuration of a dictionary management portion.
Figure 12:
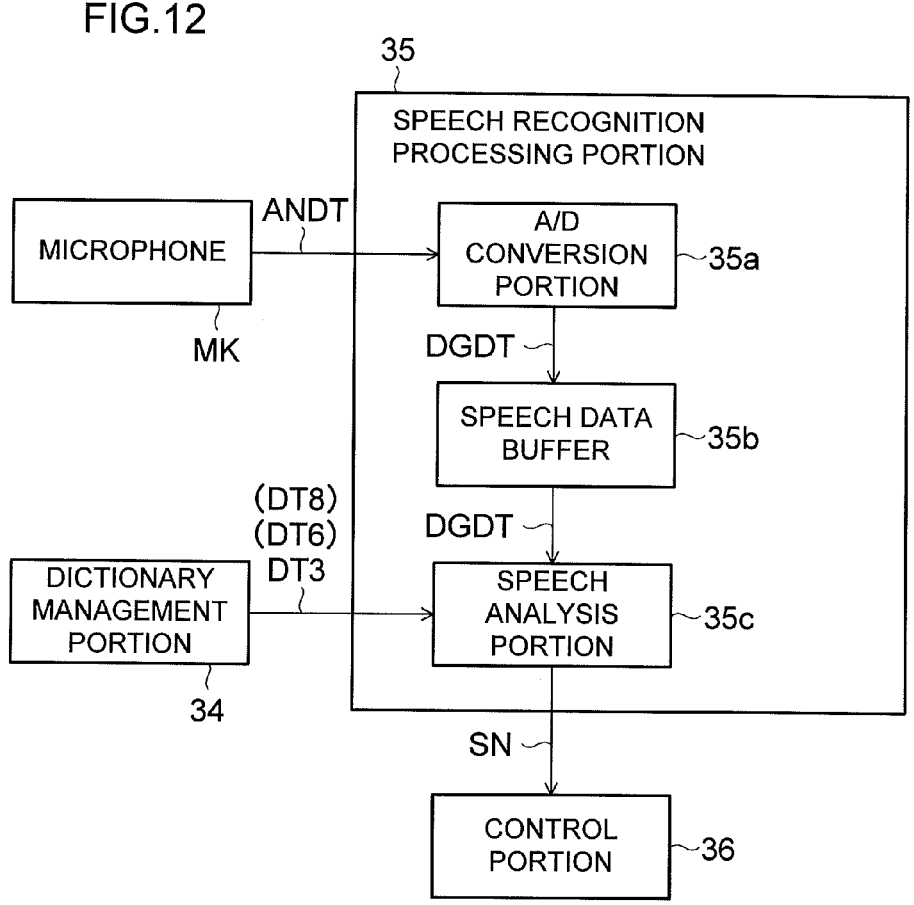
FIG. 12 is a diagram showing an example of a configuration of a speech recognition processing portion.
Figure 13:
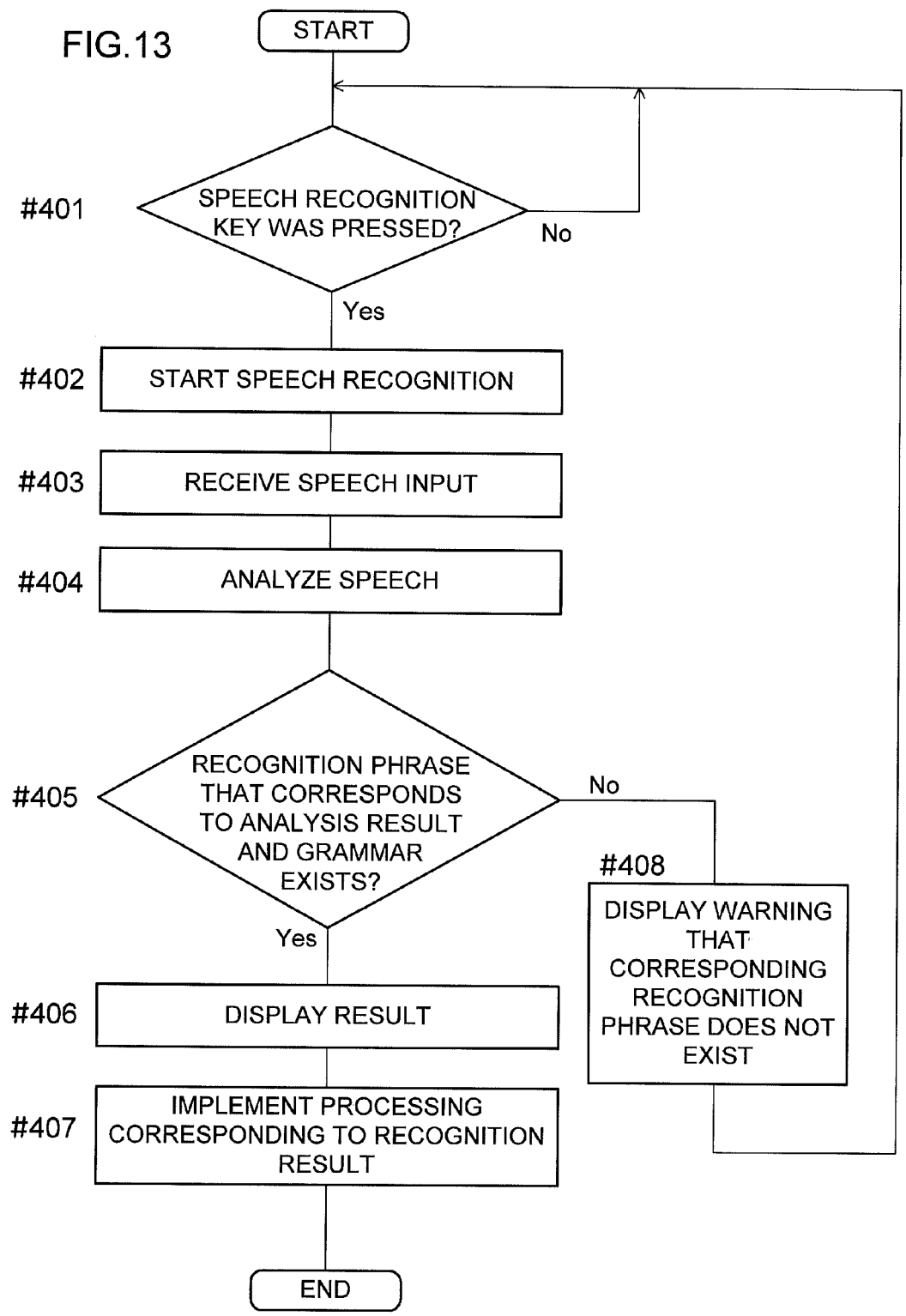
FIG. 13 is a flowchart showing an example of a flow of speech recognition processing performed by the image forming apparatus.
Figure 14:
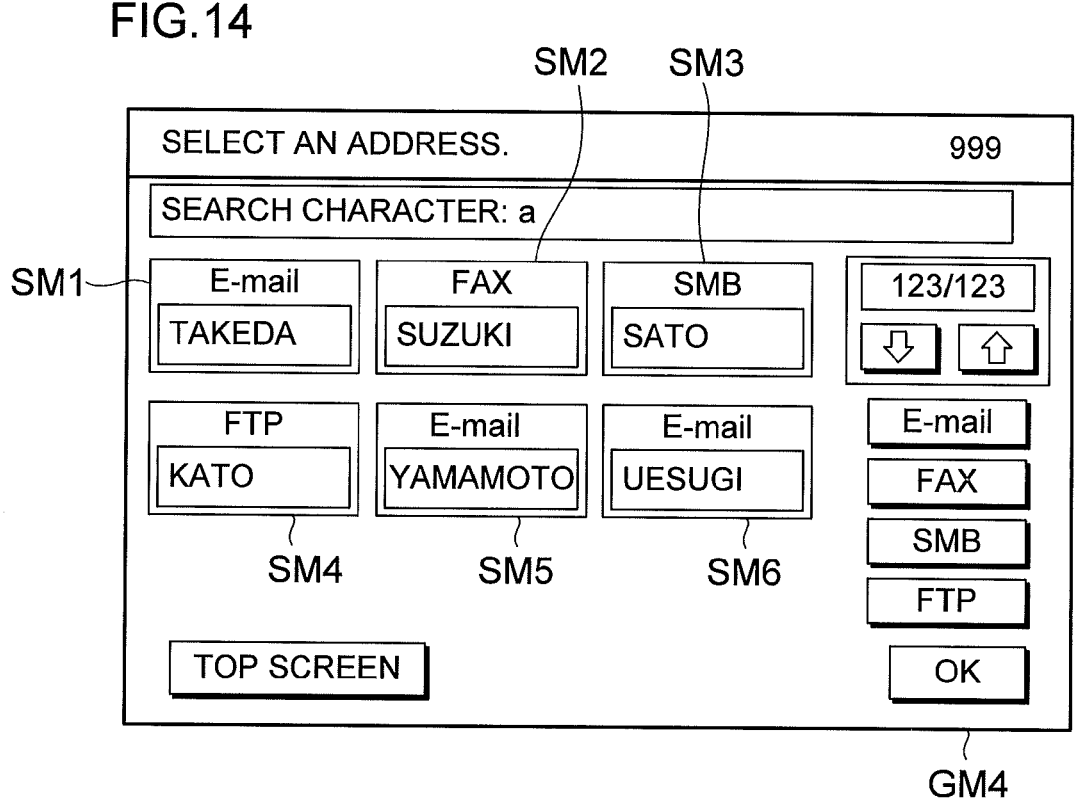
FIG. 14 is a diagram showing an example of an address selection screen.
Figure 15:
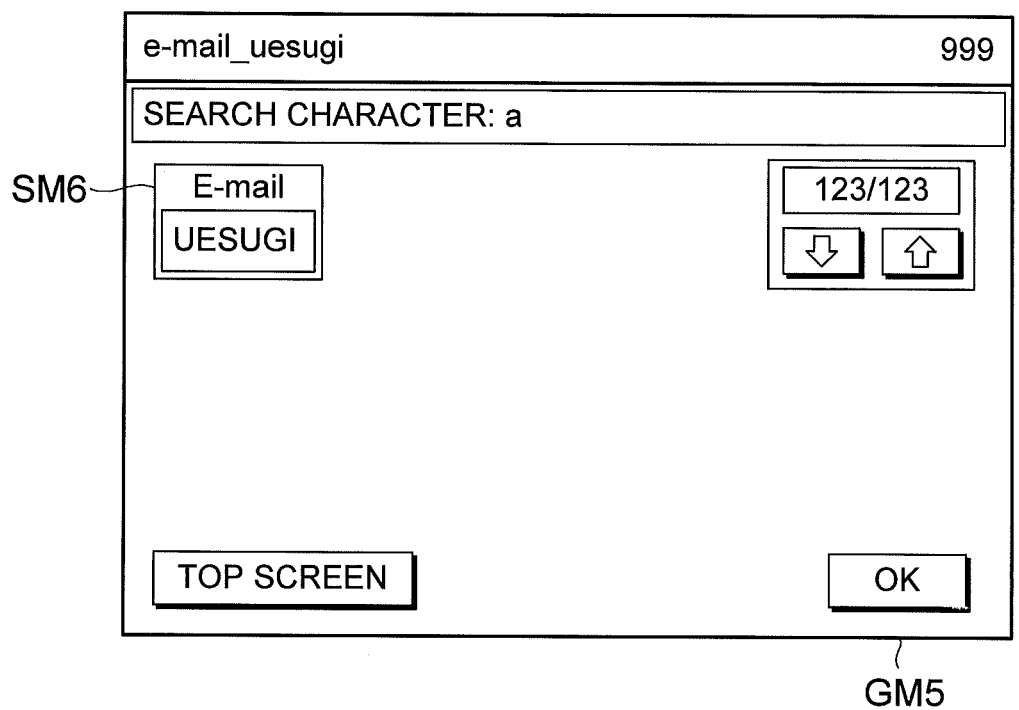
FIG. 15 is a diagram showing an example of an address selection screen.

FIG. 5 is a diagram showing an example of a registration information table TB1. FIG. 6 is a diagram showing an example of a function phrase information table TB2. FIG. 7 is a diagram showing an example of an address registration screen GM1. FIG. 8 is a diagram showing an example of a reading registration screen GM2. FIG. 9 is a diagram showing an example of a search character input screen GM3. FIG. 10 is a diagram showing an example of a recognition dictionary table TB3. FIG. 11 is a diagram showing an example of the configuration of the dictionary management portion 34. FIG. 12 is a diagram showing an example of the configuration of the speech recognition processing portion 35. FIG. 13 is a flowchart showing an example of a flow of speech recognition processing performed by the image forming apparatus 1. FIG. 14 is a diagram showing an example of an address selection screen GM4. FIG. 15 is a diagram showing an example of an address selection screen GM5.

The address registration screen GM1, the reading registration screen GM2, the search character input screen GM3, the address selection screen GM4, and the address selection screen GM5 are examples of operation screens.

Next is a detailed description of the functionality of the portions in FIG. 4, processing content, and the like.

The comprehensive information storage 30 stores the registration information table TB1. As shown in FIG. 5, address information pieces DT1 that are information related to addresses of respective users are stored and managed in the registration information table TB1. A "registration number" field in each address information piece DT1 indicates a registration number (identification number) BT for distinguishing the address information piece from other address information pieces DT1.

A "registered name" field indicates an addressee name WU1, which is the name of a user or the like. A "reading (registered name)" field indicates a reading WU2 for the name or the like indicated in the "registered name" field. A "search character" field indicates a character (search character) WU3 for searching for an address by registered name. An "address type" field indicates a transmission method for transmitting data to the address indicated in an "address" field. Examples of the transmission method include E-mail, FTP, SMB, and fax, as well as WebDAV, network box, and the like. The "address" field indicates an address WU4 used when transmitting data by the transmission method indicated in the "address type" field.

The addressee name WU1, the reading WU2, the search character WU3, the address WU4, and the like are "user phrases WU" that are designated or input by the user. Elements given the reference sign WU in Embodiments 2 to 4 are likewise "user phrases WU". Note that "user phrases WU" can also be referred to as "set phrases WU".

The function phrase information storage portion 31 stores the function phrase information table TB2. As shown in FIG. 6, function phrase information pieces DT2 that are information related to phrases indicating transmission functions provided in the image forming apparatus 1 (function phrases) are stored and managed in the function phrase information table TB2. A "function name" field in each function phrase information piece DT2 indicates a phrase indicating a transmission function provided in the image forming apparatus 1, and a "reading (function name)" field indicates a reading for the phrase indicated in the "function name" field.

Note that the phrase written in each "reading (function name)" field is a function phrase, as well as simultaneously a system phrase prepared in the image forming apparatus 1 in advance. Accordingly, these function phrases and system phrases are hereinafter referred to as "system phrases WS" or "function phrases WS". Elements given the reference sign WS in Embodiments 2 to 4 are likewise "system phrases WS" or "function phrases WS".

The display control portion 32 performs processing for displaying predetermined screens on the operation panel 10f when speech has been input or when a button with which the operation panel 10f is provided has been pressed. When no user logs in to the image forming apparatus 1, the display control portion 32 displays a login screen for inputting a user ID and password. Each screen that is displayed is given an identification number (screen number) for distinguishing the screen from other screens, and the display control portion 32 displays a screen whose screen number relates to an instruction from a comprehensive control portion 36 on the operation panel 10f.

The information writing portion 33 performs processing for writing (i.e., storing or registering), to the comprehensive information storage portion 30, registration items that have been designated or input by the user operating the touch panel TP or the operation portion TK.

The following describes a procedure performed when the user registers an address, with reference to the screens in FIGS. 7 and 8.

If the user presses the scan & fax button SB of the operation panel 10f, the address registration screen GM1 (see FIG. 7) is displayed. In this screen, the user registers a registration number, a registered name, and a destination address (in Embodiment 1, an E-mail address). These items can be input via an input key screen (not shown) in which input keys are displayed, which is displayed when a registration number button BTN1, a registered name button BTN2, or an E-mail address button BTN3 is pressed. The input items are displayed in display fields RN1, RN2, and RN3 that are respectively associated with the registration number button BTN1, the registered name button BTN2, and the E-mail address button BTN3.

If the user inputs a registration number, a registered name, and a destination address and presses an OK button, the reading registration screen GM2 (see FIG. 8) is displayed. In this screen, the user registers a reading for when saying the registered name registered in the address registration screen GM1. The user presses a registered name (reading) button BTN4 to display the input key screen (not shown), and inputs a reading. The reading may be input in hiragana or katakana. If the registered name is in English, an English pronunciation or the like is input. The input reading is then displayed in a display field RN4 associated with the registered name (reading) button BTN4.

In addition to a reading, a search character can be input and registered in the reading registration screen GM2. In this case, a search character can be input in a search character input screen GM3 (see FIG. 9) that is displayed when a search character button BTN5 is pressed. If a common button BTN6 in this screen is pressed, the registered name that is the search target can be assigned to a "common" category, which is different from the search characters.

Returning to FIG. 8, if the user inputs a reading and presses the OK button, the content input to the address registration screen GM1 and the reading registration screen GM2 is registered as an address information piece DT1 in the registration information table TB1 stored in the comprehensive information storage portion 30.

Returning to FIG. 4, the dictionary management portion 34 saves and manages recognition dictionary tables TB3 (see FIG. 10) used in speech recognition processing. As shown in FIG. 11, the dictionary management portion 34 has a dictionary database 34a, a compound phrase generation portion 34b, a phrase buffer 34c, and a compound phrase writing portion 34d.

Next is a detailed description of the functionality of the portions in FIG. 11, processing content, and the like.

In FIG. 11, the recognition dictionary database 34a stores and manages the recognition dictionary tables TB3. A recognition dictionary table TB3 is provided in association with each screen displayed on the operation panel 10f. Specifically, in the case of operating the image forming apparatus 1 by voice, the user says phrases (commands) while viewing screens (more precisely, commands indicated by buttons displayed on screens) displayed on the operation panel 10f. Accordingly, in order to recognize speech made by the user, phrases indicating commands corresponding to the displayed screen need to be stored in a recognition dictionary table TB3.

As shown in FIG. 10, recognition phrase information pieces DT3 are stored and managed in each recognition dictionary table TB3. Each recognition phrase information piece DT3 associates a phrase number BT that corresponds to the registration number of an address information piece DT1 stored in the registration information table TB1 (see FIG. 5), and phrases (recognition phrases) WN that are to be compared with character strings obtained by the conversion of speech data by speech recognition processing.

Examples of recognition phrases WN include compound phrases WF that have been generated and written by the compound phrase generation portion 34b, and command phrases WC that have been prepared in advanced as commands in association with screens in the image forming apparatus 1. The command phrases WC are used as commands for causing the execution of various types of processing or control, such as the transmission and reception of image data, image processing (e.g., printing) based on image data, and control of screens. The above-described system phrases WS are examples of command phrases WC.

The recognition phrase information pieces DT3 whose phrase numbers BT are 1 to 999 are information related to compound phrases WF, and are added by being written by the compound phrase writing portion 34d that is described later. The recognition phrase information pieces DT3 whose phrase numbers BT are 1000 to 1007 are information related to command phrases WC, and have been registered in advance in association with commands displayed in the screen having the screen number displayed in a screen number field GRN.

The compound phrase generation portion 34b performs processing for generating compound phrases WF. Specifically, compound phrases WF in Embodiment 1 are generated as all combinations of each pair of phrases WU2 and WS in different orders, the pairs being formed by a phrase WU2 indicated in the "reading (registered name)" field in the registration information table TB1 (see FIG. 5) and a phrase WS indicated in the "reading (function name)" field in the function phrase information table TB2 (see FIG. 6). Note that in the case of two target phrases, compound phrases WF are generated by combining the two phrases in inverted first/last arrangements.

Note that the combinations of phrases for generating compound phrases WF can be changed appropriately by the user. In this case, the user can appropriately select phrases among the command phrases WC or the system phrases WS, in accordance with their functions or the like.

Next is a description of processing for generating compound phrases WF.

When an address information piece DT1 is added to (registered in) the registration information table TB1 managed by the comprehensive information storage portion 30, the compound phrase generation portion 34b extracts the added address information piece DT1 from the registration information table TB1, and temporarily stores the address information piece DT1 in the phrase buffer 34c. Accordingly, the compound phrase generation portion 34b extracts, from the function phrase information table TB2 managed by the function phrase information storage portion 31, the function phrase information piece DT2 that indicates the same function name as the transmission method indicated in the "address type" field of the extracted address information piece DT1, and temporarily stores the function phrase information piece DT2 in the phrase buffer 34c. Then, the compound phrase generation portion 34b generates character data from the characters indicated in the "reading (registered name)" field and the "reading (function name)" field in the address information piece DT1 and the function phrase information piece DT2 that are stored in the phrase buffer 34c.

For example, if the address information piece DT1 having the registration number 006 is added to the registration information table TB1, the compound phrase generation portion 34b extracts that address information piece DT1 having the registration number 006 from the registration information table TB1, and temporarily stores the address information piece DT1 in the phrase buffer 34c. The compound phrase generation portion 34b then generates character data from "uesugi", which is the phrase WU2 indicated in the "reading (registered name)" field in the address information piece DT1 having the registration number 006.

Then, since "E-mail" is indicated in the "address type" field in the address information piece DT1 having the registration number 006, the compound phrase generation portion 34b extracts the function phrase information piece DT2 whose "function name" field indicates "E-mail" from the function phrase information table TB2, and temporarily stores the function phrase information piece DT2 in the phrase buffer 34c. The compound phrase generation portion 34b then generates character data from "e-mail", which is the phrase WS indicated in the "reading (function name)" field in the function phrase information piece DT2.

The compound phrase generation portion 34b generates compound phrases WF that are new character data pieces by combining the two generated character data pieces in inverted first/last arrangements. For example, in the case of the above-described example, the two compound phrases WF "uesugi_e-mail" and "e-mail_uesugi" are generated by combinations in which the first/last arrangements of "uesugi" and "e-mail" are inverted.

The compound phrase generation portion 34b sends the generated compound phrases WF to the compound phrase writing portion 34d along with the registration number BT of the address information piece DT1 used in the generation of the compound phrases WF.

The compound phrase writing portion 34d writes the compound phrases WF acquired from the compound phrase generation portion 34b in the recognition dictionary table TB3 as recognition phrases WN, with use of a phrase number BT that is the same as the registration number BT.

Returning to FIG. 4, the speech recognition processing portion 35 performs speech recognition processing on speech that has been input from the microphone MK with which the operation panel 10f is provided. As shown in FIG. 12, the speech recognition processing portion 35 has an A/D conversion portion 35a, a speech data buffer 35b, and a speech analysis portion 35c.

Next is a detailed description of the speech recognition processing, along with the functionality of the portions in FIG. 12, processing content, and the like.

The A/D conversion portion 35a converts analog speech data ANDT that has been output from the microphone MK into digital speech data DGDT.

The speech data buffer 35b temporarily stores the digital speech data DGDT output from the A/D conversion portion 35a.

The speech analysis portion 35c performs processing for analyzing the digital speech data DGDT stored in the speech data buffer 35b. In other words, the speech analysis portion 35c performs processing for recognizing speech that has been input from the microphone MK. When digital speech data DGDT is stored in the speech data buffer 35b, the speech analysis portion 35c converts the digital speech data DGDT into a character string (recognition target phrase). The speech analysis portion 35c then searches the recognition dictionary table TB3 for a recognition phrase WN that matches the recognition target phrase. If a recognition phrase WN that matches the recognition target phrase has been found (i.e., if the speech has been recognized), the speech analysis portion 35c sends the phrase number BT of that recognition phrase WN to the comprehensive control portion 36 as a search result signal SN.

The comprehensive control portion 36 extracts, from the registration information table TB1, the address information piece DT1 whose registration number BT is the same as the phrase number BT indicated by the search result signal SN, and performs processing based on that information.

If a recognition phrase WN that matches the recognition target phrase is not found (i.e., if the speech is not recognized), the speech analysis portion 35c sends, to the comprehensive control portion 36, a search result signal SN indicating that the speech was not recognized.

Returning to FIG. 4, the comprehensive control portion 36 controls an image processing portion 37, and also performs overall control of the image forming apparatus 1. The comprehensive control portion 36 also performs processing corresponding to the recognition phrases WN registered in the recognition dictionary table TB3, based on the search result signal SN from the speech recognition processing portion 35.

The image processing portion 37 performs various types of image processing on, for example, image data read by the scanner 10g or image data that has been transmitted from another apparatus, in accordance with a control signal from the comprehensive control portion 36.

Next is a description of speech recognition processing performed by the image forming apparatus 1 in the case where the user searches for an E-mail destination by voice, with reference to the screens in FIGS. 14 and 15, and the flowchart in FIG. 13.

If the user presses the scan & fax button SB of the operation panel 10f, the address selection screen GM4 is displayed as shown in FIG. 14. The address selection screen GM4 displays transmission target icons SM (SM1 to SM6) that are associated with the address information pieces DT1 stored in the registration information table TB1. Each transmission target icon SM indicates the registered name, the address type, and the like that are indicated in the corresponding address information piece DT1. In this screen, if the user presses the speech recognition button KB (#401: Yes in FIG. 13), the microphone MK of the operation panel 10f is turned on (#402), thus enabling the input of speech. The user inputs speech by saying phrases ("e-mail, uesugi" or "e-mail_uesugi") that indicate the address type (here, "E-mail") and the registered name of the transmission target address (here, "UESUGI").

Based on the speech that has been input (#403), the image forming apparatus 1 performs speech recognition processing with use of the recognition dictionary table TB3 associated with the address selection screen GM4 (#404). Specifically, the image forming apparatus 1 converts the input speech into a recognition target phrase (e.g., "e-mail_uesugi"), and searches the recognition dictionary table TB3 for a recognition phrase WN that matches "e-mail_uesugi". If a recognition phrase WN that matches the recognition target phrase is found, the speech is recognized based on the found recognition phrase WN.

In Embodiment 1, the recognition phrase WN indicated in the recognition phrase information piece DT3 whose phrase number BT is 006 matches "e-mail_uesugi".

If the speech is recognized (#405: Yes), the address selection screen GM5 (see FIG. 15) is displayed (#406), which displays only the transmission target icon SM that is associated with the address information piece DT1 whose registration number BT is the same as the phrase number BT of the recognition phrase WN that matches the recognition target phrase.

For example, the transmission target icon SM6 is associated with the address information piece DT1 having the registration number 006. If the user says "okei" and that speech is recognized while the address selection screen GM5 is displayed, the image forming apparatus 1 references the address information piece DT1 having the registration number 006 that is stored in the registration information table TB1, and displays a confirmation screen (not shown) that displays the E-mail address corresponding to "UESUGI" (#407). After confirming the E-mail address, the user can transmit image data by E-mail by pressing a transmission button or the like.

If a recognition phrase WN that matches the recognition target phrase is not found (i.e., if the speech is not recognized), the image forming apparatus 1 displays a screen (not shown) showing a warning that the speech was not recognized (#408).

The recognition dictionary table TB3 of Embodiment 1 has registered therein recognition phrases WN such as "uesugi_e-mail" and "e-mail_uesugi" that have inverted first/last arrangements of two words ("uesugi" and "e-mail"). Accordingly, speech can be recognized regardless of the order in which the user says "uesugi" and "e-mail". Also, searching for a search target can be performed using two words, thus enabling finding the search target quicker than in the case of saying words one at a time.

Embodiment 2

Next is a description of Embodiment 2 of the image forming apparatus 1 with reference to FIGS. 16 to 22. Note that constituent elements that are the same as those in the image forming apparatus 1 in Embodiment 1 have been given the same reference signs, and detailed descriptions thereof have been appropriately omitted. The same follows for the other embodiments as well.

Figure 19:
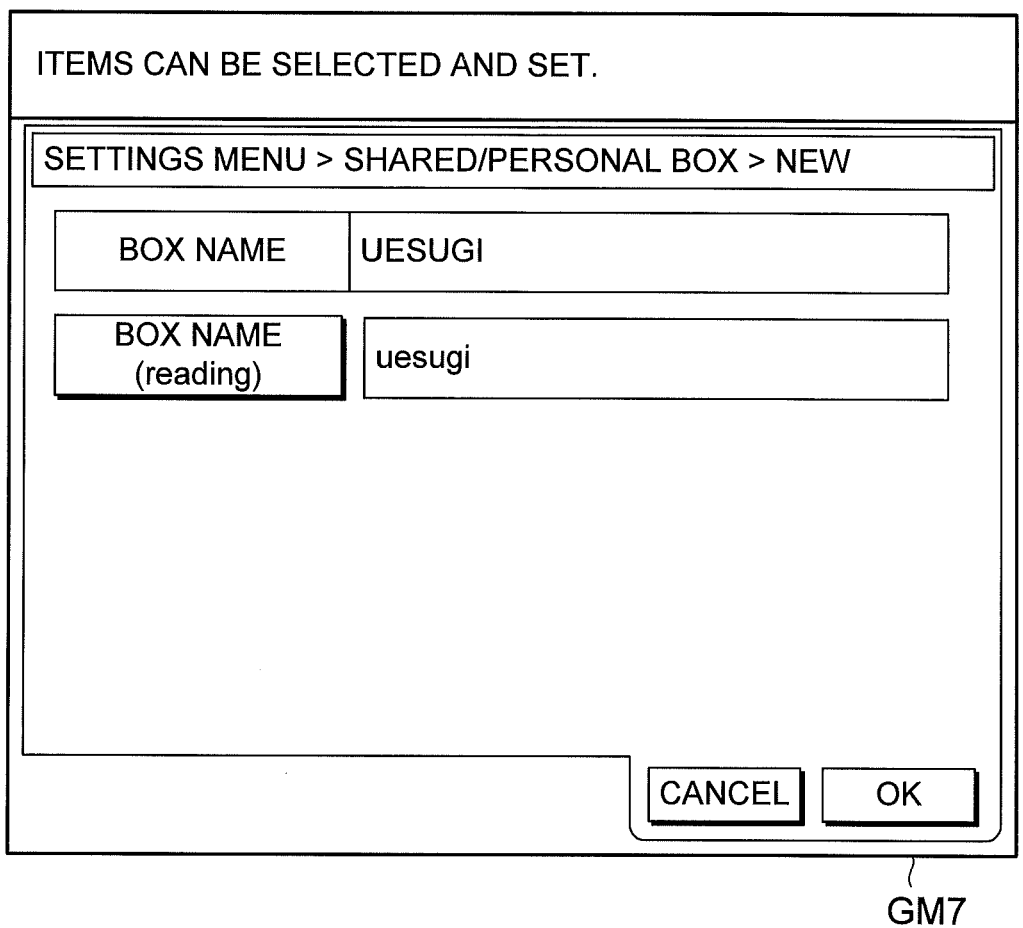
FIG. 19 is a diagram showing an example of a reading registration screen.
Figure 22:
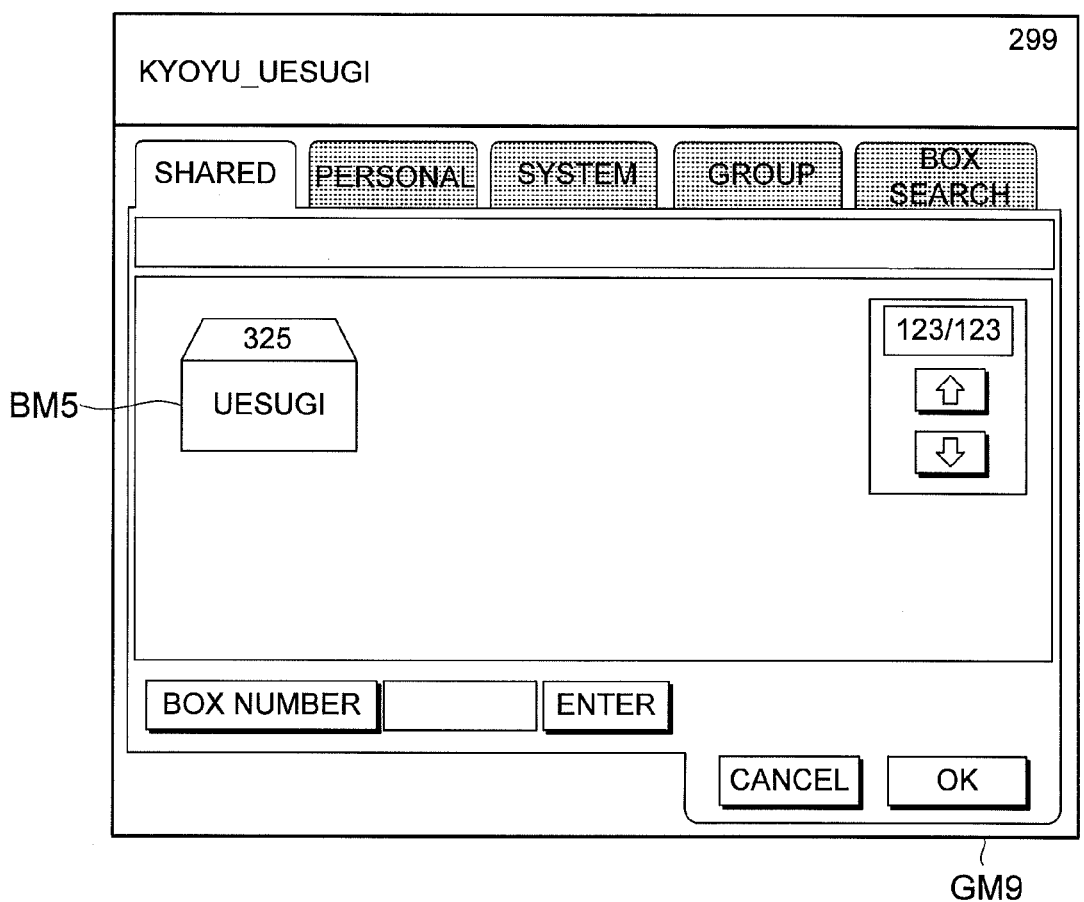
FIG. 22 is a diagram showing an example of a box selection screen.

FIG. 16 is a diagram showing an example of a registration information table TB4. FIG. 17 is a diagram showing an example of a function phrase information table TB5. FIG. 18 is a diagram showing an example of a box registration screen GM6. FIG. 19 is a diagram showing an example of a reading registration screen GM7. FIG. 20 is a diagram showing an example of a recognition dictionary table TB6. FIG. 21 is a diagram showing an example of a box selection screen GM8. FIG. 22 is a diagram showing an example of a box selection screen GM9.

The following description takes the example of the case where the user saves image data read by the scanner 10g in a box named "UESUGI" using the box function. It is also assumed that when searching for a saving destination box, the user consecutively says the box name and box type of the box that is the search target.

FIG. 16 shows the registration information table TB4 in Embodiment 2. Box information pieces DT4 that are information related to boxes of users registered in the image forming apparatus 1 are stored and managed in the registration information table TB4. A "registration number" field in each box information piece DT4 indicates a registration number (identification number) BT for distinguishing that box information piece from other box information pieces DT4. These registration numbers BT are the box numbers of the boxes. A "box name" field indicates a box name WU11. A "reading (box name)" field indicates a reading WU12 for the box name indicated in the "box name" field. A "search character" field indicates a search character WU13 for searching for a box by box name. A "box type" field indicates a box type (group name).

Additionally, although not shown in FIG. 16, the registration information table TB4 may include registration locations, transmission types, and the like of the boxes. For example, in the case where a box is registered in a server connected to the image forming apparatus 1 via a communication line instead of being registered in the image forming apparatus 1, the name of the server is indicated as the registration location of that box. A data transmission method (e.g., FTP, SMB, WebDAV, or network box) and the like are also indicated.

FIG. 17 shows a function phrase information table TB5 in Embodiment 2. As shown in FIG. 17, function phrase information pieces DT5 that are information related to box types that have been set in advance in the image forming apparatus 1 are stored and managed in the function phrase information table TB5. A "box type" field indicates the types of boxes provided in the image forming apparatus 1, and a "reading (box type)" field indicates readings WS of the phrases indicated in the "box type" field.

Next is a description of a procedure performed when a user registers a box in Embodiment 2 with reference to the screens in FIGS. 18 and 19.

If the user presses the box button TB of the operation panel 10f, the box registration screen GM6 (see FIG. 18) is displayed. In this screen, the user registers a box number, a box name, a password, a search character, a box type, and the like. These items can be input using the same method as in Embodiment 1. If the user inputs these items and presses an OK button, the reading registration screen GM7 (see FIG. 19) is displayed. In this screen, the user can input readings using the same method as in Embodiment 1.

If a reading is input and the OK button is pressed, the content input to the box registration screen GM6 and the reading registration screen GM7 is registered as a box information piece DT4 in the registration information table TB4 stored in the comprehensive information storage portion 30.

Next is a description of the recognition dictionary table TB6 of Embodiment 2.

As shown in FIG. 20, recognition phrases WN (i.e., compound phrases WF) whose phrase numbers BT are 300 to 1999 that are registered in the recognition dictionary table TB6 in Embodiment 2 are generated as all combinations of each pair of phrases WU12 and WS in different orders, the pairs being formed by a phrase WU12 indicated in the "reading (box name)" field in the registration information table TB4 and a phrase WS indicated in the "reading (box type)" field in the function phrase information table TB5.

The recognition phrases WN whose phrase numbers BT are 2000 to 2010 (i.e., command phrases WC) are phrases that have been registered in advance and indicate commands displayed in the screen having the screen number displayed in a screen number field GRN.

The method of generating the compound phrases WF is the same as the case described in Embodiment 1. Note that, in Embodiment 2 as well, the combinations of phrases for generating compound phrases WF can be changed appropriately by the user. For example, a configuration is possible in which a selection button is provided in the box registration screen GM6, the reading registration screen GM7, or the like for selecting targets (phrases) to be combined to generate compound phrases WF, and thus the user can make selections. In addition to a combination of a box name and box type, other examples of combinations include a combination of a box number and a box name, a combination of a search character and a box type, and the like.

Next is a description of speech recognition processing performed by the image forming apparatus 1 in the case where the user searches for a box to be the saving destination for image data by voice, with reference to the screens in FIGS. 21 and 22, and the flowchart in FIG. 13.

If the user presses the box button TB of the operation panel 10f, the box selection screen GM8 is displayed as shown in FIG. 21. The box selection screen GM8 displays box icons BM (BM1 to BM6) that are associated with the box information pieces DT4 stored in the registration information table TB4. Each box icon BM indicates the registration number, the box name, and the like that are indicated in the corresponding box information piece DT4. In this screen, if the user presses the speech recognition button KB (#401: Yes in FIG. 13), the microphone MK of the operation panel 10f is turned on (#402), thus enabling the input of speech. The user inputs speech by saying a phrase ("kyoyu_uesugi") that indicates the box type (here, "kyoyu" (shared)) and the box name of the saving destination box (here, "UESUGI").

Based on the speech that has been input (#403), the image forming apparatus 1 performs speech recognition processing with use of the recognition dictionary table TB6 associated with the box selection screen GM8 (#404). Specifically, the image forming apparatus 1 converts the input speech into a recognition target phrase ("kyoyu_uesugi"), and searches the recognition dictionary table TB6 for a recognition phrase WN that matches "kyoyu_uesugi". If a recognition phrase WN that matches the recognition target phrase is found, the speech is recognized. In Embodiment 2, the recognition phrase WN indicated in the recognition phrase information piece DT6 having the phrase number 325 matches "kyoyu_uesugi".

If the speech is recognized (#405: Yes), the box selection screen GM9 (see FIG. 22) is displayed (#406), which displays only the box icon BM that is associated with the box information piece DT4 whose registration number BT is the same as the phrase number BT of the recognition phrase WN that matches the recognition target phrase.

For example, the box icon BM5 is associated with the box information piece DT4 having the registration number 325. If the user says "okei" and that speech is recognized while the box selection screen GM9 is displayed, the image forming apparatus 1 references the box information piece DT4 having the registration number 325 that is stored in the registration information table TB4, and displays a confirmation screen (not shown) that displays the saved content of the box whose box name is "UESUGI" (#407). After confirming the saved content of the box, the user can save the image data in the box by pressing a save button or the like.

If a recognition phrase WN that matches the recognition target phrase is not found (i.e., if the speech is not recognized), the image forming apparatus 1 displays a screen (not shown) showing a warning that the speech was not recognized (#408).

Embodiment 3

Next is a description of Embodiment 3 of the image forming apparatus 1 with reference to FIGS. 23 to 28.

Figure 24:
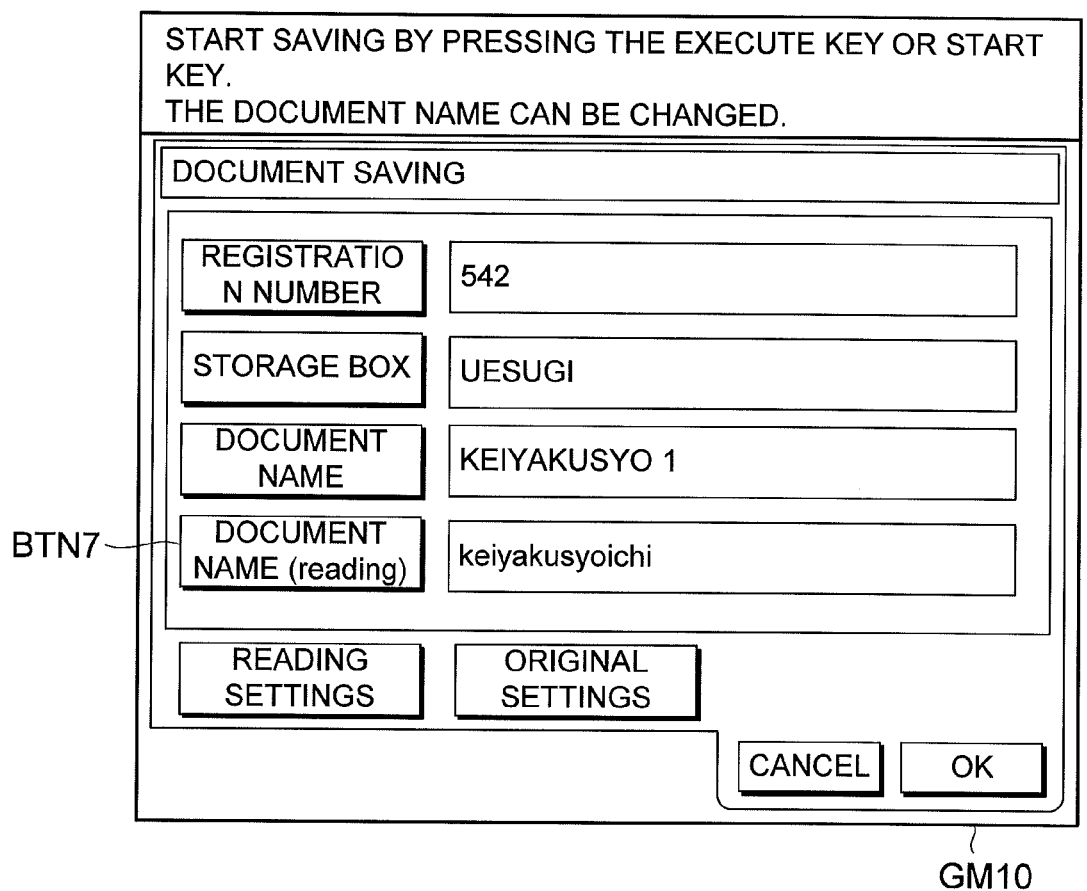
FIG. 24 is a diagram showing an example of a document save screen.
Figure 25:
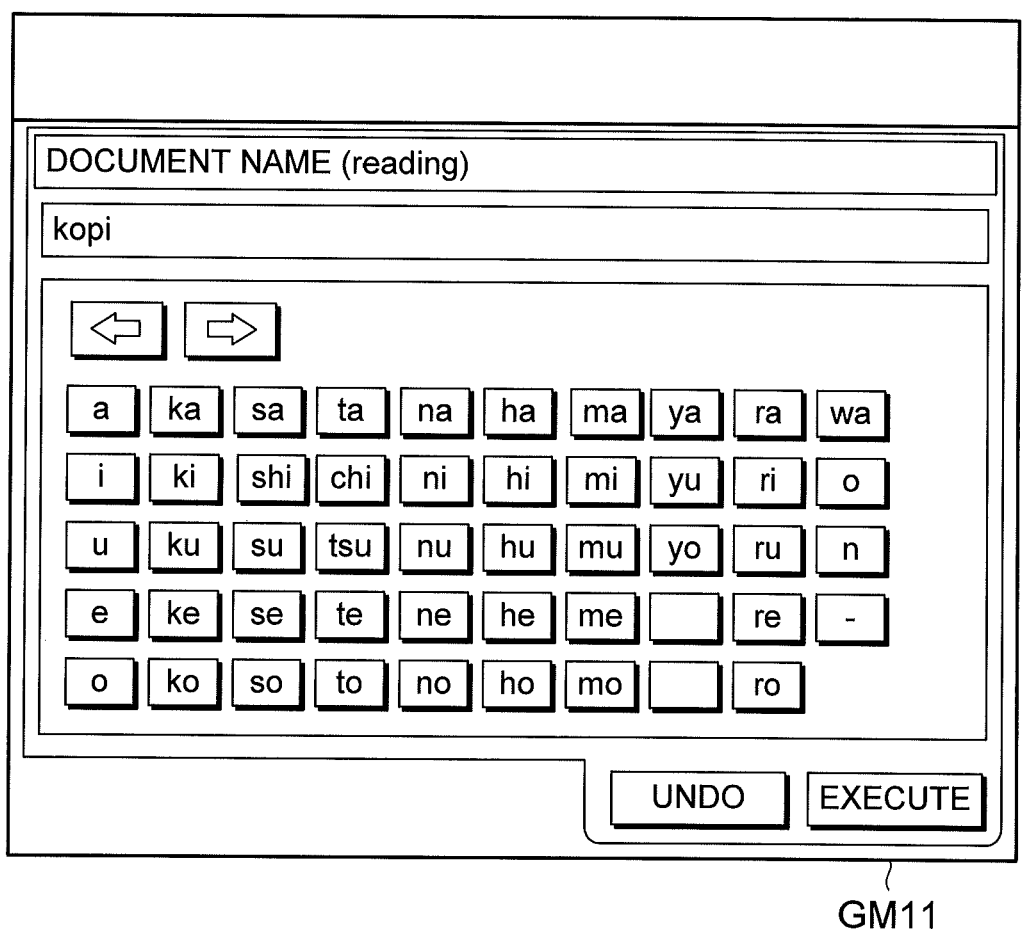
FIG. 25 is a diagram showing an example of a reading input screen.
Figure 28:
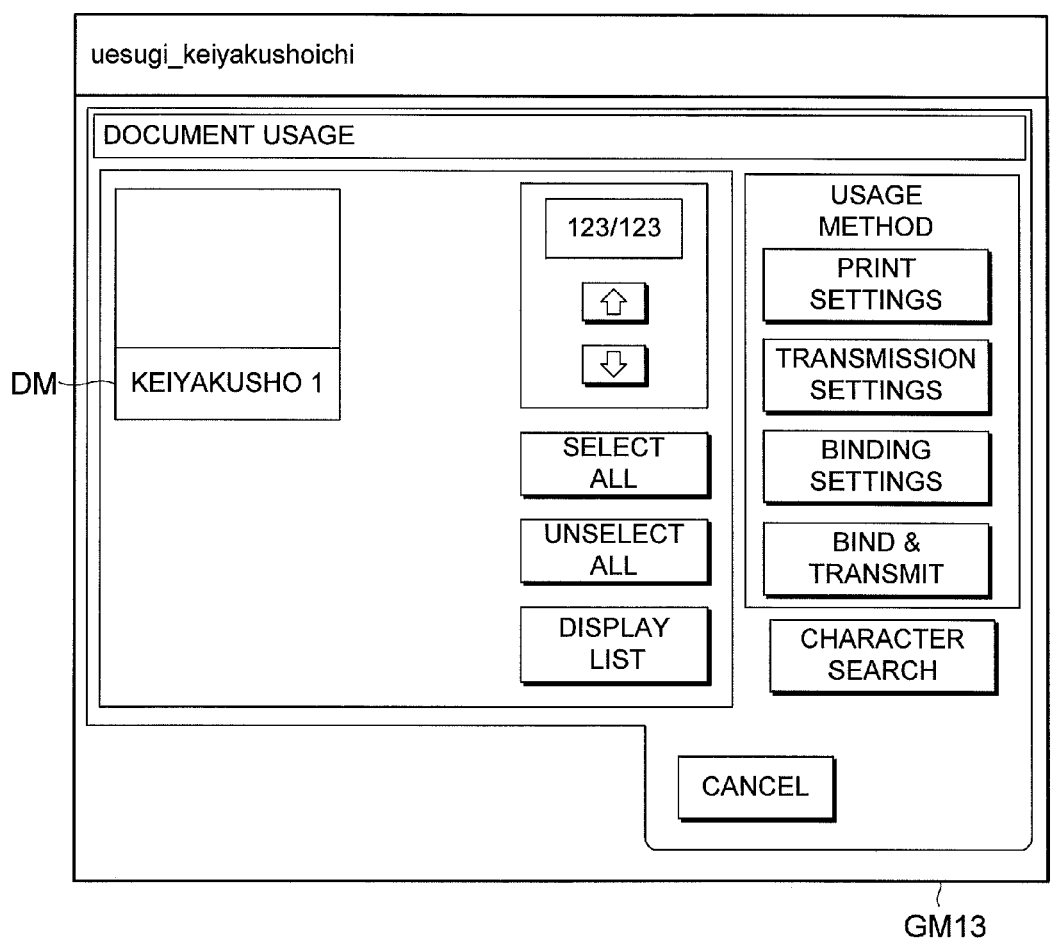
FIG. 28 is a diagram showing an example of a document usage screen.

FIG. 23 is a diagram showing an example of a registration information table TB7. FIG. 24 is a diagram showing an example of a document save screen GM10. FIG. 25 is a diagram showing an example of a reading input screen GM11. FIG. 26 is a diagram showing an example of a warning display screen GM12. FIG. 27 is a diagram showing an example of a recognition dictionary table TB8. FIG. 28 is a diagram showing an example of a document usage screen GM13.

The following description takes the example of the case where the user searches for document data (hereinafter, sometimes referred to as simply a "document") saved in a box that is registered in the image forming apparatus 1. It is also assumed that the user searches for the document by consecutively saying the document name and the box name of the box where the document is saved.

FIG. 23 shows the registration information table TB7 in Embodiment 3. Saved document information pieces DT7 that are information related to documents saved in the boxes of users registered in the image forming apparatus 1 are stored and managed in the registration information table TB7.

A "registration number" field in each saved document information piece DT7 indicates a registration number (identification number) BT for distinguishing the saved document information piece from other saved document information pieces DT7. These registration numbers BT are the document numbers of the documents.

A "document name" field indicates a document name WU21. A "reading (document name)" field indicates a reading WU22 of the document name indicated in the "document name" field. A "search character" field indicates a search character WU23 for searching for a document by document name. A "box name" field indicates a box name WU11 of the box in which the document is saved. A "reading (box name)" field indicates a reading WU12 that is the same as the box name indicated in the "reading (box name)" field of the registration information table TB4 registered by the user in Embodiment 2.

Note that the box name WU11 and the reading WU12 are registered as system phrases WS in the registration information table TB7.

Next is a description of a procedure performed when a user saves a document in a box in Embodiment 3 with reference to the screens in FIGS. 24 to 26.

If the user searches for a box using the procedure in Embodiment 2 or performs a predetermined operation, a box for saving the document is displayed. Then, if a save button or the like is pressed, the document save screen GM10 such as shown in FIG. 24 is displayed. In this screen, the user registers a registration number, a document name, and a reading for the document name. These items can be input using basically the same method as in Embodiment 1. For example, the reading for the document name can be input via the reading input screen GM11 (see FIG. 25) that is displayed when a document name (reading) button BTN7 is pressed. Here, a configuration is possible in which, if the input document name is already registered as a reading for the document name of a document already saved in that box, a warning display screen GM12 for prompting re-input such as shown in FIG. 26 is displayed.

In the case where the warning display screen GM12 is displayed, the user can return to the reading input screen GM11 and again input a reading for the document name. Note that in Embodiments 1 and 2 as well, a screen indicating a warning such as the warning display screen GM12 may be displayed if the reading input by the user is already registered, as in Embodiment 3.

If a registration number, a document name, and a reading for the document name are input and an execution button is pressed, the content input in the document save screen GM10 is registered as a box information piece DT4 in the registration information table TB7 stored in the comprehensive information storage portion 30.

Next is a description of the recognition dictionary table TB8 of Embodiment 3.

As shown in FIG. 27, recognition phrases WN (i.e., compound phrases WF) indicated by the recognition phrase information pieces DT8 having phrase numbers 500 to 2999 that are registered in the recognition dictionary table TB8 in Embodiment 3 are generated as all combinations of each pair of phrases WU22 and WS in different orders, the pairs being formed by a phrase WU22 indicated in the "reading (document name)" field in the registration information table TB7 and a phrase WS indicated in the "reading (box name)" field. The recognition phrases WN (i.e., command phrases WC)

indicated in the recognition phrase information pieces DT8 whose phrase numbers BT are 3000 to 3010 are phrases that have been registered in advance and indicate commands displayed in the screen having the screen number displayed in a screen number field GRN.

The method of generating the compound phrases WF is the same as the case described in Embodiment 1. Note that, in Embodiment 3 as well, the combinations of phrases for generating compound phrases WF can be changed appropriately by the user. Besides the combination of a box name and a document name, other examples of combinations include the combination of a box type and a document name.

Next is a description of speech recognition processing performed by the image forming apparatus 1 in the case where the user searches for a document saved in a box by voice, with reference to the screens in FIGS. 21 and 28, and the flowchart in FIG. 13.

Searching for a document can be performed from the box selection screen GM8. Specifically, the recognition dictionary table TB6 for searching for a box and the recognition dictionary table TB8 for searching for a document are associated with the box selection screen GM8.

Accordingly, if the user presses the box button TB of the operation panel 10f, the box selection screen GM8 (see FIG. 21) is displayed. If the user presses the speech recognition button KB (#401: Yes in FIG. 13), the microphone MK of the operation panel 10f is turned on (#402), thus enabling the input of speech. The user inputs speech by saying the phrase ("uesugi_keiyakushoichi") that indicates the box name (here, "UESUGI") and the document name that is the search target (here, "KEIYAKUSHO 1").

Based on the speech that has been input (#403), the image forming apparatus 1 performs speech recognition processing with use of the recognition dictionary table TB6 associated with the box selection screen GM8 (#404). Specifically, the image forming apparatus 1 converts the input speech into a recognition target phrase ("uesugi_keiyakushoichi"), and searches the recognition dictionary table TB8 for a recognition phrase WN that matches "uesugi_keiyakushoichi". If a recognition phrase WN that matches the recognition target phrase is found, the speech is recognized. In Embodiment 3, the recognition phrase WN indicated in the recognition phrase information piece DT8 having the phrase number 542 matches "uesugi_keiyakushoichi".

If the speech is recognized (#405: Yes), the document usage screen GM13 (see FIG. 28) is displayed (#406), which displays only a document icon DM that is associated with the saved document information piece DT7 whose registration number is the same as the phrase number of the recognition phrase WN that matches the recognition target phrase. For example, the document icon DM is associated with the saved document information piece DT7 having the registration number 542. Accordingly, if the user says the command name displayed in the document usage screen GM13 and that speech is recognized, the image forming apparatus 1 references the saved document information piece DT7 having the registration number 542 that is stored in the registration information table TB7, and displays a confirmation screen (not shown) that displays the content of the document whose document name is "KEIYAKUSHO 1" (#407). After confirming the content of the document, the user can perform document editing or the like by pressing a predetermined button.

If a recognition phrase WN that matches the recognition target phrase is not found (i.e., if the speech is not recognized), the image forming apparatus 1 displays a screen (not shown) showing a warning that the speech was not recognized (#408).

In Embodiments 1 to 3, readings are input and registered by the user. However, if an English name is input as an addressee registered name, a box name, or a document name, the English name may be automatically input as the reading at the time of being input. In the case where only numbers have been input as the registered name as well, the reading may be automatically input.

Embodiment 4

Figure 30:
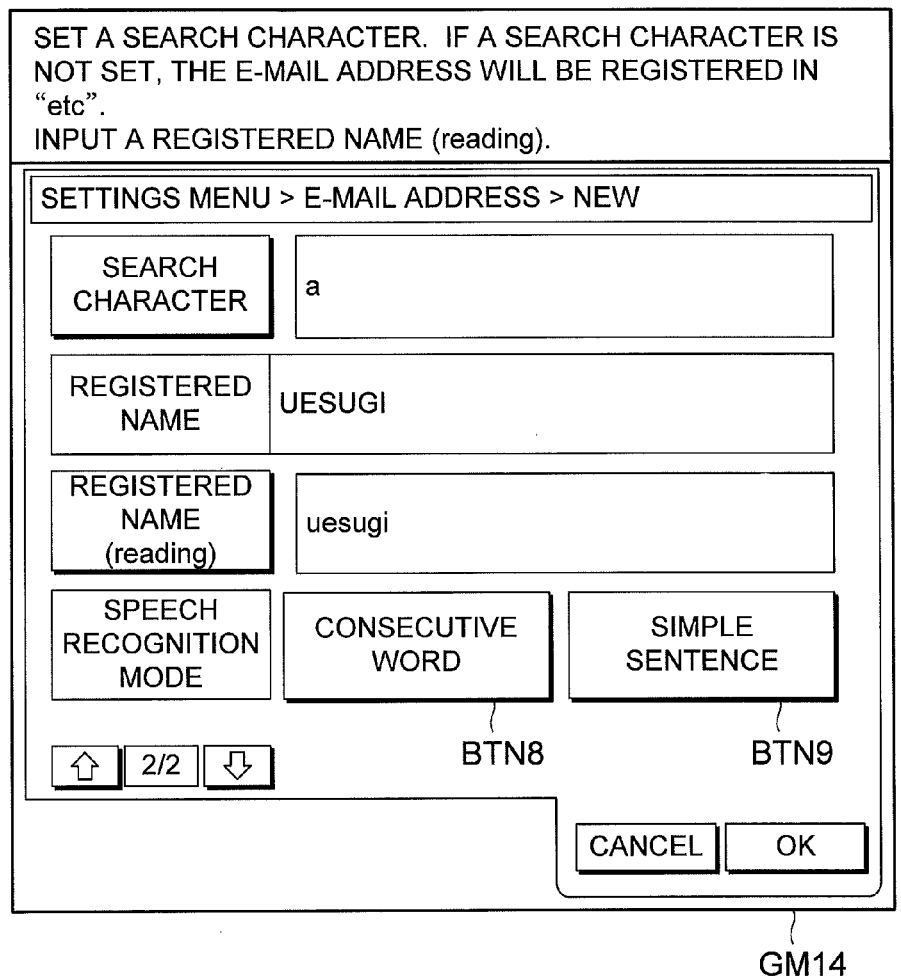
FIG. 30 is a diagram showing an example of a reading registration screen.

Next is a description of Embodiment 4 of the image forming apparatus 1 with reference to FIGS. 29 and 30.

FIG. 29 is a diagram showing an example of compound phrase generation tables TB9a and TB9b. FIG. 30 is a diagram showing an example of a reading registration screen GM14.

In Embodiments 1 to 3, recognition phrases WN to be registered in the recognition dictionary table are generated by combining only a system phrase WS, which is a phrase related to a function provided in the image forming apparatus 1, and a user phrase WU, which is a phrase that has been arbitrarily registered by the user. However, in the case of saying multiple words, the user may add a particle and a verb to the words. In view of this, in consideration of such fluctuation in language, a configuration is possible in which particles and verbs are added to combinations of system phrases WS and user phrases WU to generate recognition phrases WN.

In this case, in the generation of compound phrases WF, compound phrase generation tables TB9a and TB9b such as those shown in FIG. 29 are stored in advance in the hard disk 10d or the like. In the case of generating Japanese compound phrases WF, combinations are generated by applying both system phrases WS and user phrases WU to the compound phrase generation table TB9a. In the case of generating English compound phrases WF, combinations are generated by applying both English system phrases WS and user phrases WU to the compound phrase generation table TB9b.

For example, in Embodiment 4, in the case where the user inputs a reading for a registered name when registering an address, the reading registration screen GM14 such as shown in FIG. 30 is displayed. In this screen, in the case of generating compound phrases WF formed from only a system phrase WS and a user phrase WU (the case of a consecutive word mode), the user presses a consecutive word button BTN8, and in the case of generating compound phrases WF to which a particle and a verb have been added (the case of a simple sentence mode), the user presses a simple sentence button BTN9.

If the simple sentence button BTN8 has been pressed, the compound phrase generation portion 34b performs processing for generating compound phrases WF to which a particle and a verb have been added. For example, with use of the compound phrase generation table TB9a, the compound phrase generation portion 34b generates compound phrases WF such as "E-MAIL NO UESUGI SAN O SAGASU", "E-MAIL NO UESUGI SAN O KENSAKU SURU", "UESUGI SAN NO E-MAIL O SAGASU", AND "UESUGI SAN NO E-MAIL O KENSAKU SURU". In the case of using the compound phrase generation table TB9b, the compound phrase generation portion 34b generates English compound phrases WF such as "Look for UESUGI's E-mail.", "Look for E-mail for UESUGI.", "Retrieve UESUGI's fax.", and "Retrieve E-mail for UESUGI.".

In Embodiment 4, if the simple sentence button BTN8 has been pressed, recognition phrases including a particle and a verb are generated. However, a configuration is possible in which two types of compound phrases WF are generated, namely compound phrases that do not include a particle or verb (the compound phrases in Embodiments 1 to 3) and compound phrases that include a particle and a verb (the compound phrases in Embodiment 4), and the two types of compound phrases WF are registered in a compound dictionary table.

Figure 31:
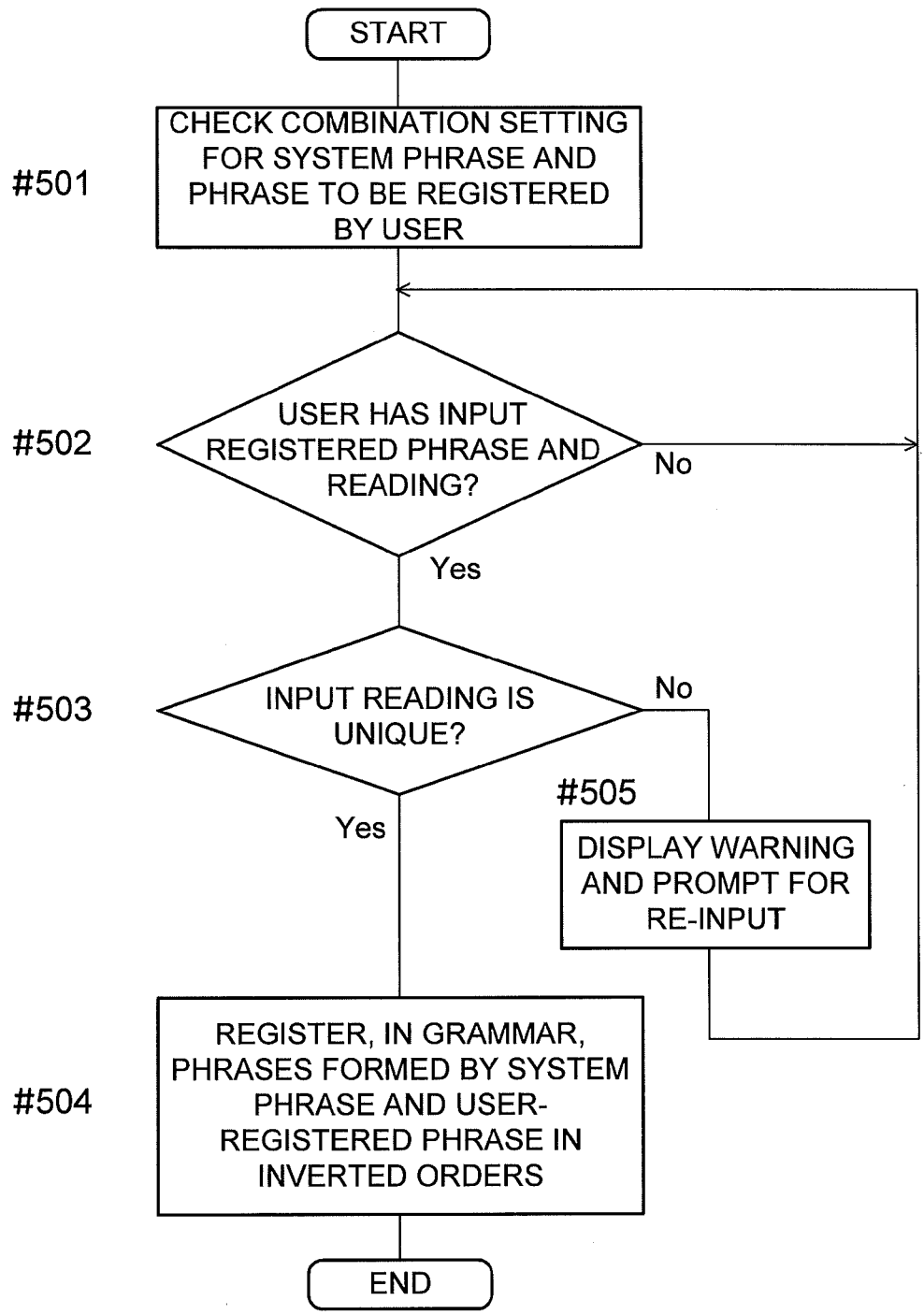
FIG. 31 is a flowchart for describing an example of a flow of overall processing performed by the image forming apparatus according to Embodiments 1 to 3.
Figure 32:
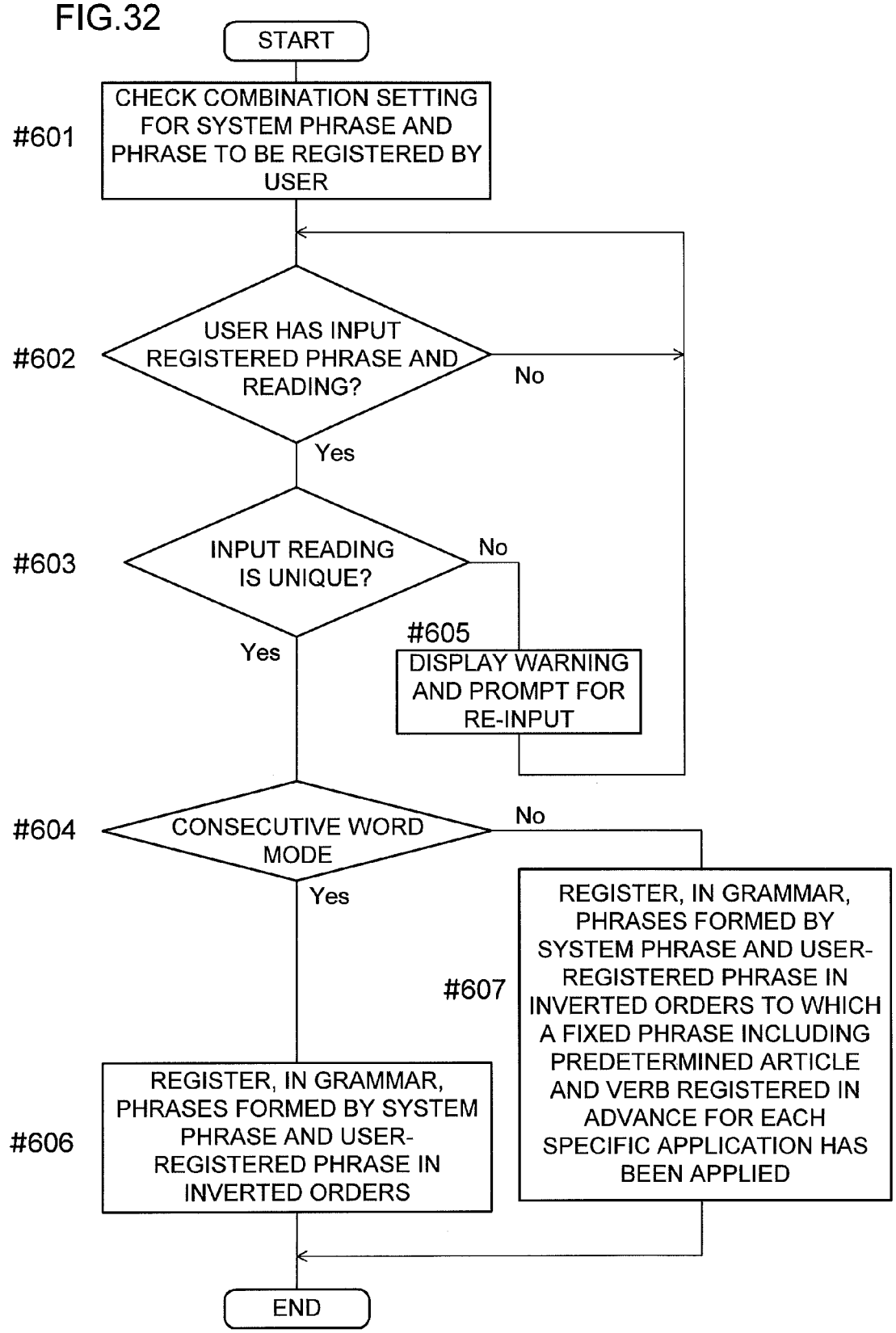
FIG. 32 is a flowchart for describing an example of a flow of overall processing performed by an image forming apparatus according to Embodiment 4.

FIG. 31 is a flowchart for describing an example of a flow of overall processing performed by the image forming apparatus 1 according to Embodiments 1 to 3. FIG. 32 is a flowchart for describing an example of a flow of overall processing performed by the image forming apparatus 1 according to Embodiment 4.

Next is a description of overall processing performed by the image forming apparatus 1 according to Embodiments 1 to 3 with reference to the flowchart of FIG. 31.

If the user operates the operation panel 10f to display various types of registration screens (the address registration screen GM1, the box registration screen GM6, or the document save screen GM10), the image forming apparatus 1 reads a setting regarding phrase combinations for generating compound phrases WF (#501). Next, if the user has input a reading for an addressee name, a box name, a document name, or the like in a predetermined reading registration screen (the reading registration screen GM2, the reading registration screen GM7, or the reading registration screen GM14), a determination is made as to whether the input reading is already registered in the image forming apparatus 1. If the input reading is not already registered (#503: Yes), compound phrases WF are generated by combining the system phrase WS and the user phrase WU in inverted first/last arrangements, and the generated compound phrases WF are registered in a recognition dictionary table (#504). If the input reading is already registered in the image forming apparatus 1 (#503: No), a screen indicating a warning is displayed (#505).

Next is a description of overall processing performed by the image forming apparatus 1 according to Embodiment 4 with reference to the flowchart of FIG. 32.

The processing of #601 to #603 is the same as in the flowchart of FIG. 31. If the input reading is not already registered (#603: Yes), the image forming apparatus 1 determines whether the consecutive word mode or the simple sentence mode has been selected. If the consecutive word mode has been selected (#604: Yes), similarly to Embodiments 1 to 3, compound phrases WF are generated by combining the system phrase WS and the user phrase WU in inverted first/last arrangements, and the generated compound phrases WF are registered in the recognition dictionary table (#605). If the simple sentence mode has been selected (#604: No), a recognition phrase generation table 9 is used to generate compound phrases WF that include particles and verbs added to combinations of the system phrase WS and the user phrase in inverted first/last arrangements, and the generated compound phrases WF are registered in the recognition dictionary table (#606).

The above-described embodiments enable performing speech recognition correctly without the user needing to pay attention to the order in which multiple words or phrases are said.

In the above-described embodiments, the scanner 10g corresponds to an "image reading apparatus" of the present invention, the microphone MK corresponds to a "speech input portion" of the present invention, the recognition phrase information pieces DT3, DT6, and DT8 each correspond to "phrase information" of the present invention, and the recognition dictionary tables TB3, TB6, and TB8 each correspond to a "dictionary" of the present invention. The readings indicated in the "reading "registered name)" field of the address information pieces DT1 and the "reading (function name)" field of the function phrase information pieces DT2, the readings indicated in the "reading (box name)" field of the box information pieces DT4 and the "reading (box type)" field of the function phrase information pieces DT5, and the readings indicated in the "reading (document name)" field and the "reading (box type)" field of the saved document information pieces DT7 each correspond to "a plurality of predetermined phrases" of the present invention. The compound phrase generation portion 34b corresponds to a "compound phrase generation portion" of the present invention, the compound phrase writing portion 34d corresponds to a "compound phrase writing portion" of the present invention, the recognition target phrases each correspond to a "speech phrase" of the present invention, the speech recognition processing portion 35 corresponds to a "speech recognition portion" of the present invention, and the image processing portion 37 corresponds to an "image processing portion" of the present invention.

Also, the address information pieces DT1, the box information pieces DT4, and the saved document information pieces DT7 each correspond to "associated information" of the present invention, and the comprehensive information storage portion 30 corresponds to an "associated information storage portion" of the present invention.

Furthermore, the function phrase information storage portion 31 corresponds to a "function phrase storage portion" of the present invention, the information writing portion 33 corresponds to an "arbitrary phrase storage portion" of the present invention, and the phrases indicated in the "reading (registered name)" field of the address information pieces DT1, the "reading (box name)" field of the box information pieces DT4, and the "reading (document name)" field of the saved document information pieces DT7 each correspond to a "user phrase" of the present invention.

Moreover, the dictionary management portion 34 and the speech recognition processing portion 35 correspond to a "speech recognition processing apparatus" of the present invention.

Although compound phrases WF are generated from a combination of two words in the embodiments described above, the compound phrases WF may be generated by combining three or more words. In this case as well, it is sufficient to generate compound phrases WF by generating all combinations of the three or more words in different orders (i.e., by generating all permutations).

Additionally, the configurations of the network system SYS and the image forming apparatus 1, the functions, the content indicated by the data pieces, the content of the tables, the content and order of the processing, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing apparatus provided with an image reading apparatus that reads an image of an original, the image processing apparatus comprising:
 a speech input portion that receives an input of speech from a user;
 a dictionary storage portion that stores a dictionary configured by phrase information pieces for recognizing the speech;
 a compound phrase generation portion that generates a plurality of compound phrases formed by all combinations of a plurality of predetermined phrases in different orders;
 a compound phrase registration portion that registers the plurality of compound phrases that have been generated in the dictionary as the phrase information pieces;
 a speech recognition portion that, in a case where speech including a speech phrase formed by the plurality of predetermined phrases said in an arbitrary order has been input, performs speech recognition on the speech by searching the dictionary for a compound phrase that matches the speech phrase;
 an image processing portion that executes processing on the image based on a result of the speech recognition performed by the speech recognition portion;
 an associated information storage portion that stores associated information pieces that are associated with the compound phrases;
 a function phrase storage portion that stores a function phrase that is related to a function that the image processing apparatus has;
 a user phrase writing portion that writes a user phrase designated by the user to the associated information storage portion; and
 a processor to control one or more of the portions;
 wherein the image processing portion extracts an associated information piece among the associated information pieces stored in the associated information storage portion based on the result of the speech recognition performed by the speech recognition portion, and executes processing on the image with use of the extracted associated information piece; and
 wherein the compound phrase generation portion generates the compound phrases with use of the function phrase and the user phrase.

2. The image processing apparatus according to claim 1, wherein a plurality of dictionaries are provided in association with a plurality of operation screens prepared for display on a display apparatus, and
 the speech recognition portion performs speech recognition on the speech with use of the dictionary that corresponds to the operation screen displayed on the display apparatus at the time the speech was input.

3. The image processing apparatus according to claim 1, wherein in a case where the user phrase designated by the user has already been written to the associated information storage portion, a warning is displayed to the user on the display apparatus.

4. An image processing apparatus provided with an image reading apparatus that reads an image of an original, the image processing apparatus comprising:
 a speech input portion that receives an input of speech from a user;
 a dictionary storage portion that stores a dictionary configured by phrase information pieces for recognizing the speech;
 a compound phrase generation portion that generates a plurality of compound phrases formed by all combinations of a plurality of predetermined phrases in different orders;

a compound phrase registration portion that registers the plurality of compound phrases that have been generated in the dictionary as the phrase information pieces;

a speech recognition portion that, in a case where speech including a speech phrase formed by the plurality of predetermined phrases said in an arbitrary order has been input, performs speech recognition on the speech by searching the dictionary for a compound phrase that matches the speech phrase;

an image processing portion that executes processing on the image based on a result of the speech recognition performed by the speech recognition portion; and a processor to control one or more of the portions;

wherein the compound phrase generation portion generates the plurality of compound phrases formed by the combinations to which a predetermined particle and a predetermined verb have been added such that the compound phrases are sentences.

5. A speech recognition processing apparatus for performing speech recognition on speech, comprising:

a speech input portion that receives an input of speech from a user;

a dictionary storage portion that stores a dictionary configured by phrase information pieces for recognizing the speech;

a compound phrase generation portion that generates a plurality of compound phrases formed by all combinations of a plurality of predetermined phrases in different orders;

a compound phrase registration portion that registers the plurality of compound phrases that have been generated in the dictionary as the phrase information pieces;

a speech recognition portion that, in a case where speech including a speech phrase formed by the plurality of predetermined phrases said in an arbitrary order has been input, performs speech recognition on the speech by searching the dictionary for a compound phrase that matches the speech phrase;

an associated information storage portion that stores associated information pieces that are associated with the compound phrases, an image processing portion that extracts an associated information piece among the associated information pieces stored in the associated information storage portion based on a result of the speech recognition performed by the speech recognition portion, and executes processing on the image with use of the extracted associated information piece a function phrase storage portion that stores a function phrase that is related to a function that the image processing apparatus has;

a user phrase writing portion that writes a user phrase designated by the user to the associated information storage portion; and a processor to control one or more of the portions;

wherein the compound phrase generation portion generates the compound phrases with use of the function phrase and the user phrase.

6. A control method for using a processor to control a speech recognition processing apparatus to perform speech recognition, the method comprising the steps of:

storing, in the speech recognition processing apparatus, a dictionary configured by phrase information pieces for recognizing speech;

generating a plurality of compound phrases formed by all combinations of a plurality of predetermined phrases in different orders;

storing in an associated information storage portion associated information pieces that are associated with the compound phrases;

registering the plurality of compound phrases that have been generated in the dictionary as the phrase information pieces;

performing by a speech recognition portion, in a case where speech including a speech phrase formed by the plurality of predetermined phrases said in an arbitrary order has been input, speech recognition on the speech by searching the dictionary for a compound phrase that matches the speech phrase;

extracting an associated information piece among the associated information pieces stored in the associated information storage portion based on the result of the speech recognition performed by the speech recognition portion;

using an image processing portion to execute processing on an image with use of the extracted associated information piece;

storing a function phrase that is related to a function that the image processing portion has; and writing a user phrase designated by the user to the associated information storage portion, wherein the compound phrase generation portion generates the compound phrases with use of the function phrase and the user phrase.

7. A non-transitory computer readable storage medium for storing a computer program for causing a computer to control a speech recognition processing apparatus for performing speech recognition, when executed by the computer, the computer program causing the speech recognition processing apparatus to realize:

a compound phrase generation portion that generates a plurality of compound phrases formed by all combinations of a plurality of predetermined phrases in different orders;

a compound phrase registration portion that registers the plurality of compound phrases that have been generated in a dictionary as phrase information pieces for recognizing speech; and a speech recognition portion that, in a case where speech including a speech phrase formed by the plurality of predetermined phrases said in an arbitrary order has been input, performs speech recognition on the speech by searching the dictionary for a compound phrase that matches the speech phrase;

an associated information storage portion that stores associated information pieces that are associated with the compound phrases, a function phrase storage portion that stores a function phrase that is related to a function that the image processing apparatus has; and a user phrase writing portion that writes a user phrase designated by the user to the associated information storage portion;

wherein the image processing portion extracts an associated information piece among the associated information pieces stored in the associated information storage portion based on the result of the speech recognition performed by the speech recognition portion, and executes processing on the image with use of the extracted associated information piece; and wherein the compound phrase generation portion generates the compound phrases with use of the function phrase and the user phrase.

8. A speech recognition processing apparatus for performing speech recognition on speech, comprising:
- a speech input portion that receives an input of speech from a user;
- a dictionary storage portion that stores a dictionary configured by phrase information pieces for recognizing the speech;
- a compound phrase generation portion that generates a plurality of compound phrases formed by all combinations of a plurality of predetermined phrases in different orders;
- a compound phrase registration portion that registers the plurality of compound phrases that have been generated in the dictionary as the phrase information pieces;
- a speech recognition portion that, in a case where speech including a speech phrase formed by the plurality of predetermined phrases said in an arbitrary order has been input, performs speech recognition on the speech by searching the dictionary for a compound phrase that matches the speech phrase; and
- a processor for controlling one or more of the portions;
- wherein the compound phrase generation portion generates the plurality of compound phrases formed by the combinations to which a predetermined particle and a predetermined verb have been added such that the compound phrases are sentences.

9. A control method for using a processor to control a speech recognition processing apparatus to perform speech recognition, comprising the steps of:
- storing, in the speech recognition processing apparatus, a dictionary configured by phrase information pieces for recognizing speech;
- using a compound phrase generation portion to generate a plurality of compound phrases formed by all combinations of a plurality of predetermined phrases in different orders;
- registering the plurality of compound phrases that have been generated in the dictionary as the phrase information pieces; and
- performing, in a case where speech including a speech phrase formed by the plurality of predetermined phrases said in an arbitrary order has been input, speech recognition on the speech by searching the dictionary for a compound phrase that matches the speech phrase;
- wherein the compound phrase generation portion generates the plurality of compound phrases formed by the combinations to which a predetermined particle and a predetermined verb have been added such that the compound phrases are sentences.

10. A non-transitory computer readable storage medium for storing a computer program for causing a computer to control a speech recognition processing apparatus for performing speech recognition, when executed by the computer, the computer program causing the speech recognition processing apparatus to realize:
- a compound phrase generation portion that generates a plurality of compound phrases formed by all combinations of a plurality of predetermined phrases in different orders;
- a compound phrase registration portion that registers the plurality of compound phrases that have been generated in a dictionary as phrase information pieces for recognizing speech; and
- a speech recognition portion that, in a case where speech including a speech phrase formed by the plurality of predetermined phrases said in an arbitrary order has been input, performs speech recognition on the speech by searching the dictionary for a compound phrase that matches the speech phrase;
- wherein the compound phrase generation portion generates the plurality of compound phrases formed by the combinations to which a predetermined particle and a predetermined verb have been added such that the compound phrases are sentences.

* * * * *